United States Patent [19]
Brown

[11] Patent Number: 5,719,713
[45] Date of Patent: Feb. 17, 1998

[54] AUTOMATIC SIDE VIEW MIRROR TRACKING SYSTEM

[75] Inventor: James L. Brown, Lindenhurst, N.Y.

[73] Assignee: Ultra-View Technology, Inc., Newark, N.J.

[21] Appl. No.: 202,929

[22] Filed: Feb. 28, 1994

[51] Int. Cl.$^6$ .................... G02B 5/08; G02B 7/182; B60R 1/06
[52] U.S. Cl. .................... 359/843; 359/872; 359/877
[58] Field of Search .................... 359/841, 843, 359/844, 872, 877; 307/10.1

[56] References Cited

U.S. PATENT DOCUMENTS

| | | |
|---|---|---|
| 3,686,473 | 8/1972 | Shim et al. . |
| 3,761,164 | 9/1973 | McKee et al. . |
| 4,267,494 | 5/1981 | Matsuoka et al. . |
| 4,425,717 | 1/1984 | Marcus . |
| 4,609,265 | 9/1986 | McKee et al. . |
| 4,679,158 | 7/1987 | Tate . |
| 4,747,679 | 5/1988 | Beach, Jr. . |
| 4,798,967 | 1/1989 | Yamana et al. . |
| 4,936,671 | 6/1990 | Kaspar . |
| 4,938,577 | 7/1990 | Sugita . |
| 4,955,704 | 9/1990 | Janowicz . |
| 4,991,950 | 2/1991 | Lang et al. . |
| 5,056,905 | 10/1991 | Jensen . |
| 5,097,362 | 3/1992 | Lynas . |
| 5,110,196 | 5/1992 | Lang et al. . |
| 5,132,851 | 7/1992 | Bomar et al. . |
| 5,137,247 | 8/1992 | Lang et al. . |
| 5,196,965 | 3/1993 | Lang et al. . |
| 5,212,467 | 5/1993 | Park . |
| 5,249,083 | 9/1993 | Doughtie et al. . |
| 5,306,953 | 4/1994 | Weiner . |
| 5,583,703 | 12/1996 | Lang et al. . |

FOREIGN PATENT DOCUMENTS

| | | |
|---|---|---|
| 0 476 600 | 3/1992 | European Pat. Off. . |
| 2578046 | 8/1986 | France . |

OTHER PUBLICATIONS

Fleet Owner Special Report "What's New in Mirrors", Apr. 1993.

*Primary Examiner*—Ricky D. Shafer
*Attorney, Agent, or Firm*—Lowe, Price, LeBlanc & Becker

[57] ABSTRACT

An automatic side view mirror tracking and control system enables drivers of articulated vehicles such as tractor trailers to keep visual contact with the side and rear of the trailer throughout a turn while backing the vehicle. This is accomplished without driver intervention through the use of a microprocessor receiving the outputs of either a plurality of ultrasonic transducers or a pair of fluxgate compasses. The microprocessor uses the aforementioned outputs to determine the rotational angle between the trailer and the tractor. Based upon these determinations, the mirror is moved to a position commensurate with the subject angle so that the driver of the vehicle is able to view the side and rear corner of the vehicle. A software filter prevents the mirror from being moved unless a predetermined change in the vehicle angle is detected.

30 Claims, 21 Drawing Sheets

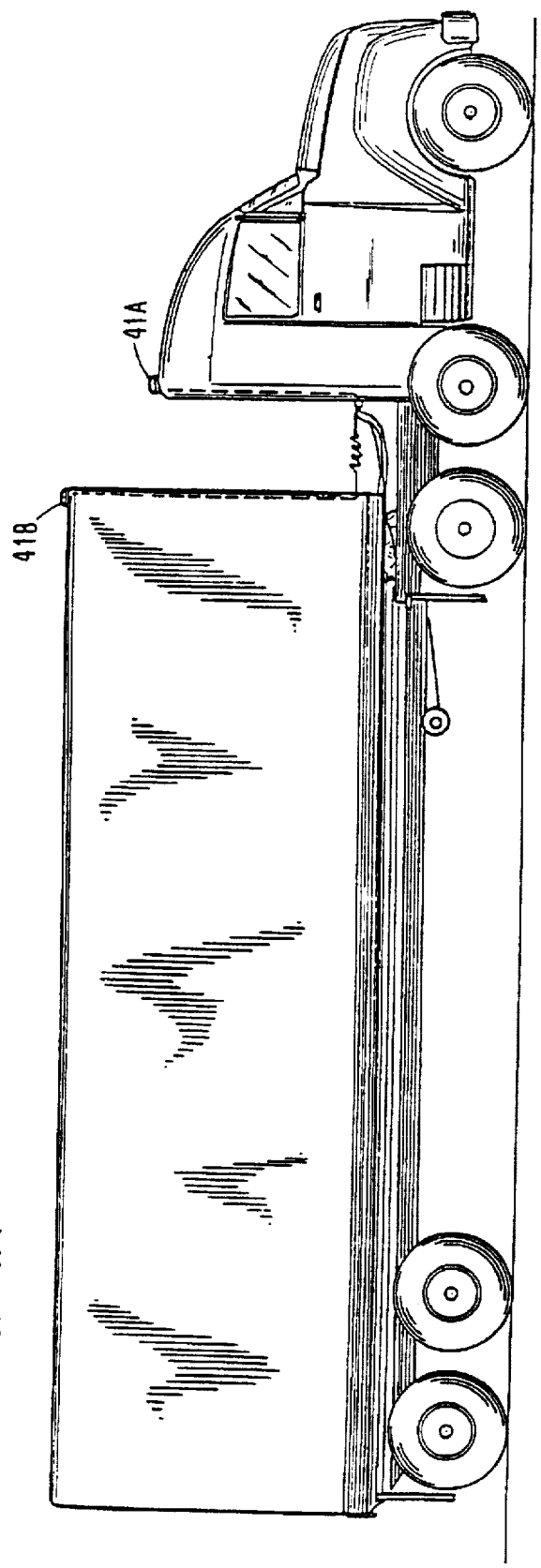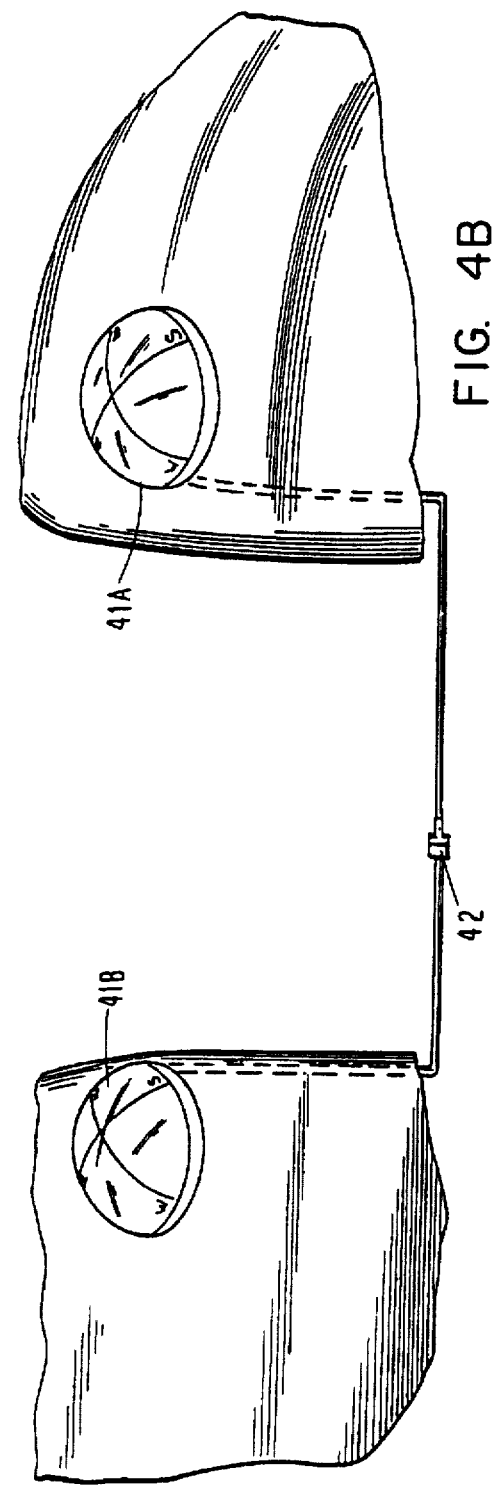
FIG. 4A
FIG. 4B

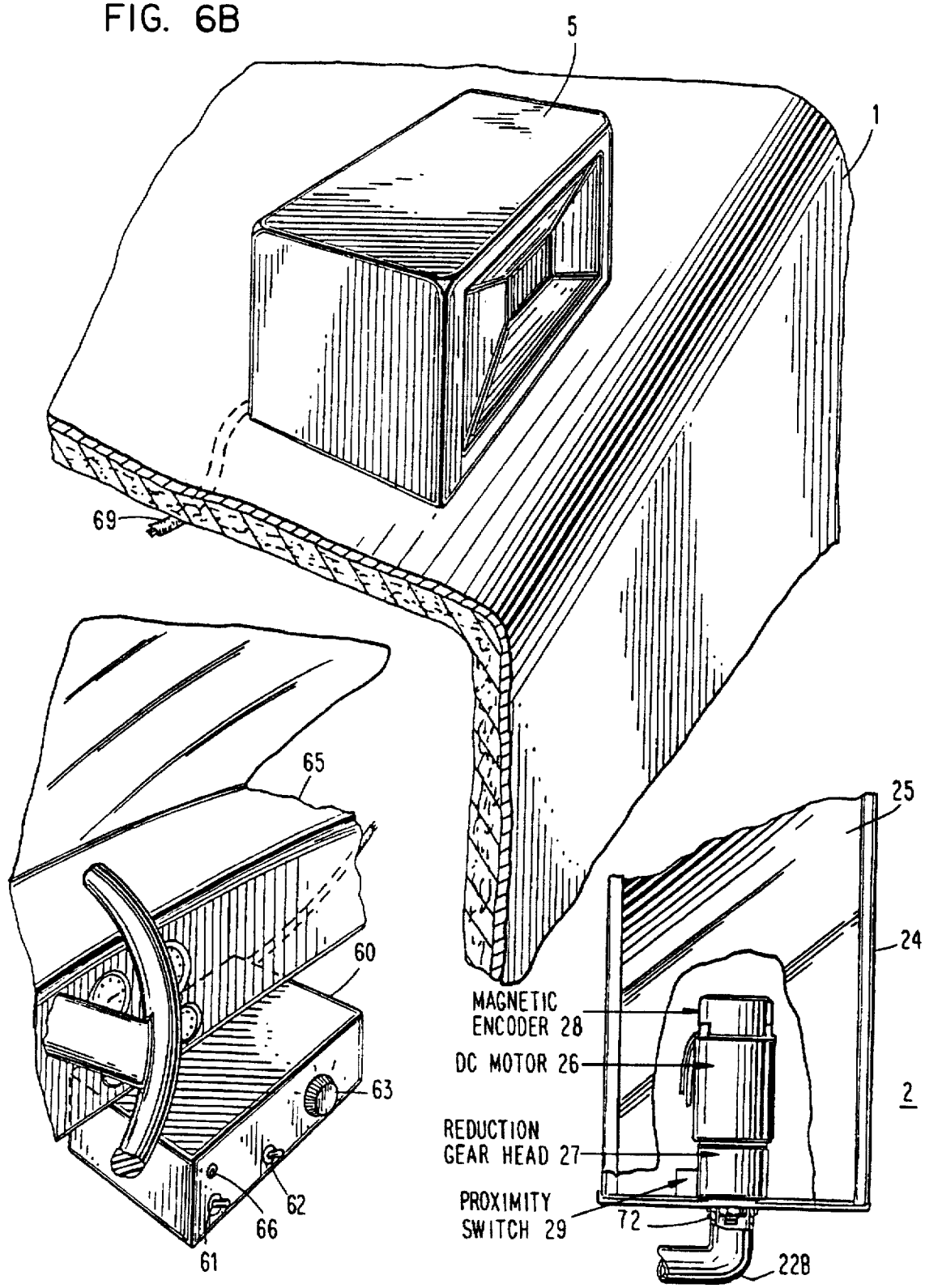

TABLE 1

| Trailer Distance for Right Turn Trailer is 4 feet from sensor |||
|---|---|---|---|
| Calculated data in ft. ||||
| TURN ANGLE (Degrees) | PASSENGER SENSOR | CENTER SENSOR | DRIVER SENSOR |
| 0 | 4.00 | 4.00 | 4.00 |
| 10 | 3.57 | 3.92 | 4.25 |
| 20 | 2.92 | 3.57 | 4.25 |
| 30 | 2.50 | 3.15 | 4.14 |
| 40 | 2.34 | 2.56 | 3.95 |
| 50 | 2.82 | 2.07 | 3.51 |
| 60 | 3.04 | 2.16 | 2.94 |
| 70 | 3.24 | 2.58 | 2.42 |
| 80 | 3.29 | 2.93 | 2.60 |
| 90 | 3.00 | 3.00 | 3.00 |

TABLE 2

| Distance measured by Microcontroller as units of time based on System crystal clock frequency = 9.212 Mhz ||||
|---|---|---|---|
| TURN ANGLE (Degrees) | PASSENGER SENSOR | CENTER SENSOR | DRIVER SENSOR |
| 0 | 352 | 352 | 352 |
| 10 | 318 | 345 | 374 |
| 20 | 260 | 318 | 374 |
| 30 | 223 | 280 | 365 |
| 40 | 208 | 228 | 352 |
| 50 | 251 | 184 | 312 |
| 60 | 270 | 192 | 262 |
| 70 | 289 | 230 | 215 |
| 80 | 293 | 260 | 231 |
| 90 | 267 | 267 | 267 |

TABLE 3

| Table used by Microcontroller to determine Trailer Turning Angle Values = change in distance from Zero Angle value ||||
|---|---|---|---|
| TURN ANGLE (Degrees) | PASSENGER SENSOR | CENTER SENSOR | DRIVER SENSOR |
| 0 | 0 | 0 | 0 |
| 10 | 34 | 7 | -22 |
| 20 | 92 | 34 | -22 |
| 30 | 129 | 72 | -13 |
| 40 | 144 | 124 | 0 |
| 50 | 101 | 168 | 40 |
| 60 | 82 | 160 | 90 |
| 70 | 63 | 122 | 137 |
| 80 | 59 | 92 | 121 |
| 90 | 85 | 85 | 85 |

FIG. 11

FIG. 20A
5' APPROX.
FRONT
FIG. 20B
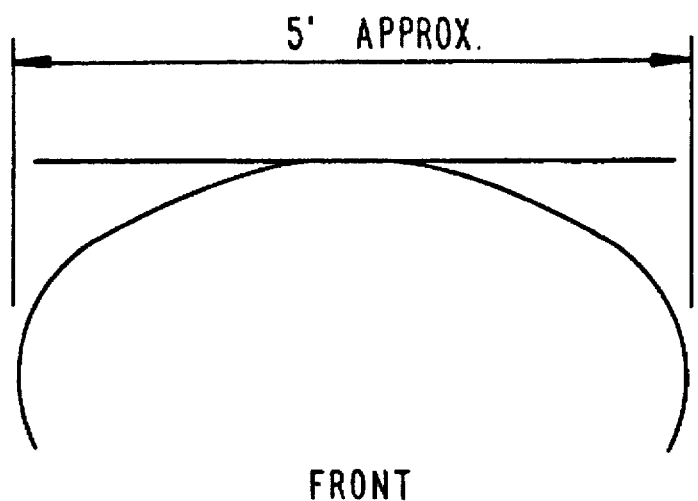
FIG. 20C
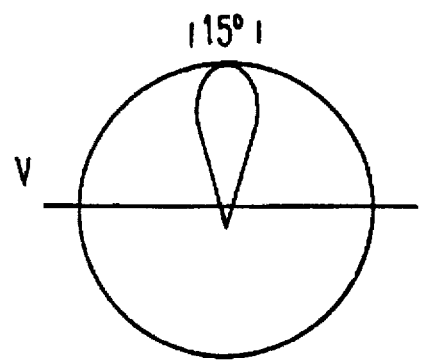

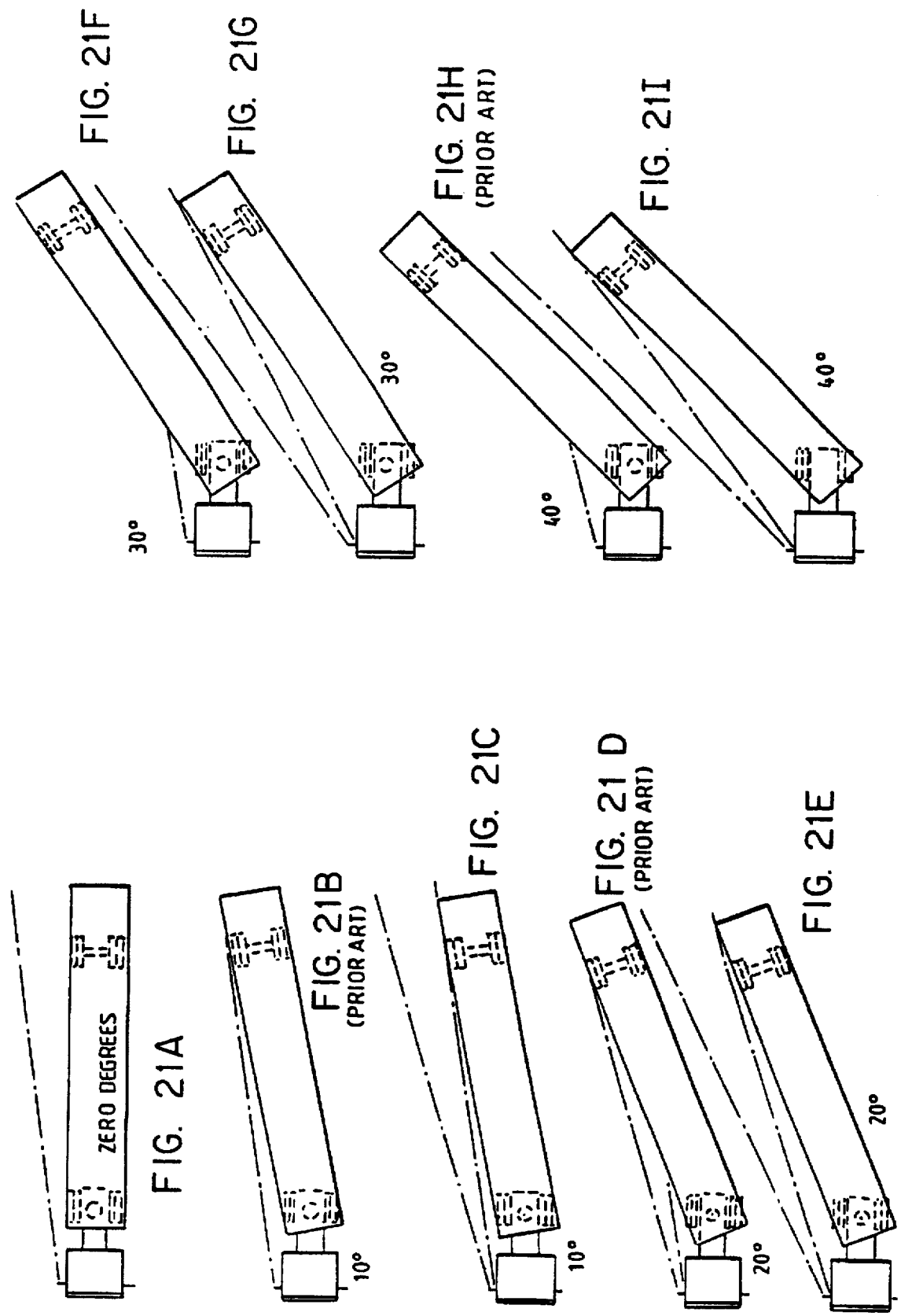

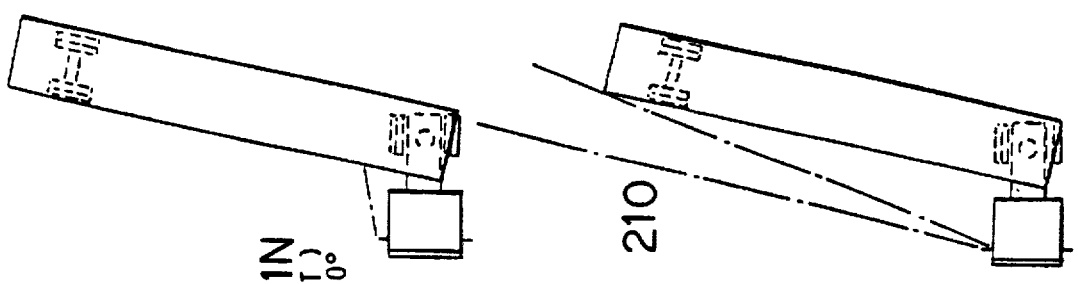
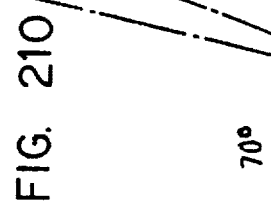

AUTOMATIC SIDE VIEW MIRROR TRACKING SYSTEM

TECHNICAL FIELD

This invention relates to automatic mirror tracking control for side view mirrors on hinged vehicles such as tractor-trailers, camping trailers, boats with tow vehicles and other articulated vehicles. In particular, the present invention is directed to a system which accurately measures the turning angle of a trailer and uses this measurement to accurately position the side view mirror keeping the rear-side corner of the vehicle in the driver's view at all times.

BACKGROUND ART

A driver of a semi-trailer and semi-tractor having a trailer portion large enough to obstruct the view directly behind the semi must rely exclusively on outside rear view mirrors to see the area behind the trailer. When such tractor-trailers are traveling forward on a road or highway, hand adjustable outside rear view mirrors are generally satisfactory for providing the appropriate view of the rear corners of the trailer. On such vehicles, the driver simply adjusts both outside mirrors by hand when the trailer is straight. A standard exterior side-view mirror normally provides an approximately 15° field of view.

However, when the driver is maneuvering the semi in close quarters, such as loading docks, and particularly when backing, the trailer is turned relative to the tractor so that the normal rear view from one of the fixed outside mirrors is partially or totally blocked by the bulk of the trailer, while the view from the other mirror is widely divergent from the rear of the vehicle. This is known in the industry as "blind side driving", and is a cause of many accidents costing millions of dollars annually. This problem is illustrated in FIG. 1 in which rear view mirror 2, mounted on tractor 1 will reflect the image of only the side 3.1 of trailer 3 as the trailer turns during a backing operation. Additional examples of such situations are depicted in FIGS. 21A–21O.

It is noted that when the tractor and the trailer are in a straight line, the distance between them is equal across the width of the vehicle. As a turn is made, the trailer's inside edge comes closer to the tractor while the outside edge moves away. The minimum distance between the tractor and trailer is located between this inside edge and the back of the tractor which has a normal projection to this edge. The minimum point (occurring at corner 3' as depicted in FIG. 10) sweeps across the back width of the tractor as the turning angle increases. When the tractor has turned a full 90° in relation to the trailer, the distance measurements will again be equal across the width of the tractor since the trailer will be perpendicular to the back of the tractor.

One method of dealing with this situation is for the driver to make a series of small, incremental adjustments to the mirror for each few feet that the trailer is moved. With each move, the driver must get out of the tractor and walk beyond the trailer to check the progress, and adjust the mirrors accordingly. These steps are repeated many times until the trailer is satisfactorily parked. While this method is often instructed by trucking companies, and is considered mandatory by the Department of Transportation, it is seldom used by drivers for reasons of convenience and excessive time consumption. Instead, the "best guess" method is often used where the driver simply uses the extremely limited visual information available from the driver's seat and guesses the location of the trailer relative to the rest of the environment. The result is many unnecessary accidents.

Previous attempts to remedy these problems have been made by redesigning the mirrors themselves to include the use of wide angle or "fish-eye" lenses and the use of remote controlled rear view mirrors. In the former, the use of wide angle lenses results in substantial distortion of the driver's view, including loss of depth perception and detail. This makes the image available from such mirrors unreliable for close quarter maneuvering. One example of a remote-controlled mirror includes a four-way control provided so that the driver can adjust both of the mirrors in the horizontal and vertical axes from the driver seat. Such systems are generally not satisfactory since the driver is simply too busy to constantly adjust the mirror controls to compensate for the turning trailer while simultaneously guiding the tractor-trailer in its rearward course. Further, the driver is not always assured of the proper viewing angle while turning the tractor trailer.

One attempt to create an automatic mirror tracking control system is found in U.S. Pat. No. 5,132,851 to Bomar. This system utilizes a steering wheel linkage as a pick-up wheel to determine relative vehicle angles; an ultrasonic transducer; and a radio frequency control link to the servo motor effecting mirror movement. This system has certain drawbacks making the automatic tracking of the side view mirror problematical. First, a very complicated steering wheel linkage system is used which does not correctly reflect relative vehicle angles in a backing situation. For example, if a trailer is at some non-zero angle when the tractor starts to back up, the trailer will increase in turning angle relative to the tractor without the steering wheel being turned so that the increase in angle is not recognized by the system. Consequently, the steering wheel linkage would provide no information to the driver under such conditions. The calibration of the linkage to every type of tractor-trailer arrangement is an awkward and time-consuming task, mitigating against use of this system for a wide variety of tractor-trailer combinations. Further, the amount of wheel movement does not always translate to the turning angle between the tractor and the trailer. For example, if a tractor-trailer is in a straight line position and not moving while the wheel is turned fully clockwise, the wheel linkage would respond as if the vehicle was in a full right turn. Thus, when the tractor-trailer begins to move, the relative vehicle turning angle would start at zero and sweep through to 90° without the steering wheel moving from its fully clockwise position.

The Bomar system requires only one ultrasonic transducer to measure the distance and turning angle. However, the result is not always accurate since the measured distance decreases to a minimum at some turning angle depending on the location of the transducer, and then increases until 80° is reached. Consequently, using this one transducer configuration, the direction of the turning trailer would not be known for a large portion of the turning radius centered around this minimum distance point since the data would start to repeat. The same result would occur even for two transducers spaced evenly apart from the center line of the vehicle. It is further noted that the radio-controlled mirror movement is not recognized by the system since there is no feedback mechanism indicating the exact position of the mirror. Consequently, small errors will always be introduced resulting in the driver not seeing the rear side corner of the trailer under some conditions.

The problems of mirror tracking for a backing tractor trailer are addressed by a similar system found in U.S. Pat. No. 4,679,158 to Tate. Like the Bomar system, the Tate system uses a steering wheel linkage, resulting in the same inaccuracies as described with respect to the Bomar system.

This system also uses a stepping motor requiring a modulated pulse signal to move the mirror. This is activated by a radio frequency direction finding system with components mounted on both the trailer and the tractor. It is noted that accurate angle measurement between the tractor and the trailer becomes problematical for angles exceeding 60° due to the inside of the edge of the trailer interfering with the RF path to the receiver. Also, the rotating mechanical linkage is located next to the "fifth wheel" where large amounts of grease and dirt accumulate, making a long-term accuracy of this component problematical.

It is noted that these conventional art attempts at automatic side view mirror tracking share limitations regarding accuracy and long-term operability, as well as other problems caused by complex mechanical systems. It is clear then that a safe and reliable automatic rear view mirror tracking control system is needed for semi-trailers and other articulated vehicles. Such a control system should constantly adjust mirror angles to compensate for varying tractor-trailer angles occurring as the trailer is turned relative to the tractor. This system should not interfere with the driver's primary task, i.e., controlling the vehicle, and should be accurate at all possible positions between the tractor and the trailer, as well as compensating for various incongruities between steering wheel position and tractor-trailer position. Further, such a system should not be susceptible to breakdown caused by the environment in which an associated vehicle operates.

DISCLOSURE OF THE INVENTION

Accordingly, it is an object of the present invention to provide an exterior side-view mirror tracking control apparatus capable of reliable operation in the environmental conditions in which a vehicle operates.

It is another object of the present invention to provide a mirror tracking control system which is accurate for all positions and attitudes between parts of an articulated vehicle, regardless of steering wheel position.

Yet another object of the present invention is to provide a mirror tracking control system which constantly adjusts the mirror angle based upon changes in vehicle position.

Yet a further object of the present invention is to provide full coverage mirror view of the vehicle by a radiation system used to determine respective vehicle angles.

A still further object of the present invention is to provide a mirror tracking control system in which a clear path for radiation between tractor and trailer is not required for the operation of the system.

It is yet another object of the present invention to provide a mirror tracking control system which does not require components mounted on the trailer of the tractor-trailer vehicle.

An additional object of the present invention is to provide a mirror tracking control system for a tractor-trailer in which the mirror is moved only for a predetermined amount of trailer attitude change, so that unnecessary mirror movement does not occur.

It is yet an additional object of the present invention to provide a mirror tracking control system which can be used on a variety of different tractor-trailer configurations.

It is yet a further object of the present invention to provide a mirror tracking control system which can be used on a variety of different vehicles, including construction equipment, boats (for docking) and airplanes (while moving on the ground).

It is still a further object of the present invention to provide a mirror control system for an articulated vehicle, in which measurements indicative of inconsequential movement of the vehicle are ignored as are measurements indicative of anomalous vehicle movement.

The aforementioned objects are carried out using a mirror tracking control system with a mirror moving unit for moving the mirror and a microprocessor arranged to control movement of the mirror. At least three ultrasonic transducers are arranged on a first part of the articulated vehicle (preferably the tractor), to provide inputs to the microprocessor so the distance measurements can be determined. A feedback arrangement for transferring an indication of the position of the mirror moving unit back to the microprocessor is also used so the clear indication of the mirror position is provided.

A second embodiment of the present invention includes a mirror tracking control system with a mirror mounted on an articulated vehicle and motivated by a microprocessor controlled moving unit. Two fluxgate compasses are mounted on two portions of the articulated vehicle to provide differential directions to the microprocessor indicating angles between the two portions of the articulated vehicle. Also included is a feedback arrangement for transferring the position of the moving unit to the microprocessor so that mirror position is always provided.

The present invention can be carried out using a method in which an angle between first and second portions of an articulated vehicle is determined, and that a change in that angle from a previous angle is within predetermined limits. The change in the angle is compared to a stored mirror position and a motor operated to move the mirror to a predetermined position corresponding to the subject change in the angle.

In the first embodiment of the present invention the three or more ultrasonic transducers are mounted on the upper third of the rear surface of the tractor or on the top of the tractor and are spaced equidistantly across the width of the tractor. Under some conditions it may be necessary to offset the transducers from the rear surface of the tractor if the trailer is less than twelve inches from the tractor. The transducers preferably provide a radiation pattern having a 40° spread along a horizontal axis and a 15° spread along a vertical axis. Both embodiments use software filters to eliminate anomalous distance or angle measurements. The first embodiment also uses a software filter to disregard changes in distance measurement which are greater than a predetermined value. This is done by determining if readings within a predetermined set of parameters have been received five times in a row. Other readings are checked to determine if a difference of greater than 10% has been determined between former readings and present readings.

The attainment of these and related objects, which will become apparent from the remainder of the specification, claims and drawings of this application, may be achieved through the use of a first embodiment of the present invention.

BRIEF DESCRIPTION OF DRAWINGS

FIGS. 4A and 4B are diagrams illustrating the mountings of fluxgate compasses on a tractor-trailer employing a second embodiment of the present invention.

FIGS. 6A–6C are composite diagrams illustrating the three major and separate components used with the present invention.

FIG. 11 illustrates three tables utilized in the calculation of trailer turning angle based upon sensor outputs.

FIGS. 20A–20C are diagrams illustrating the radiation pattern of an ultrasonic transducer used with one embodiment of the present invention.

FIGS. 21A–21O are diagrams illustrating different tractor-trailer positions and resulting driver viewing angles.

Wiring diagrams for one embodiment of the present invention are contained in Appendix I attached hereto to illustrate a commercial version of at least one operative embodiment of the present invention.

BEST MODE FOR CARRYING OUT THE INVENTION

Figure 1:
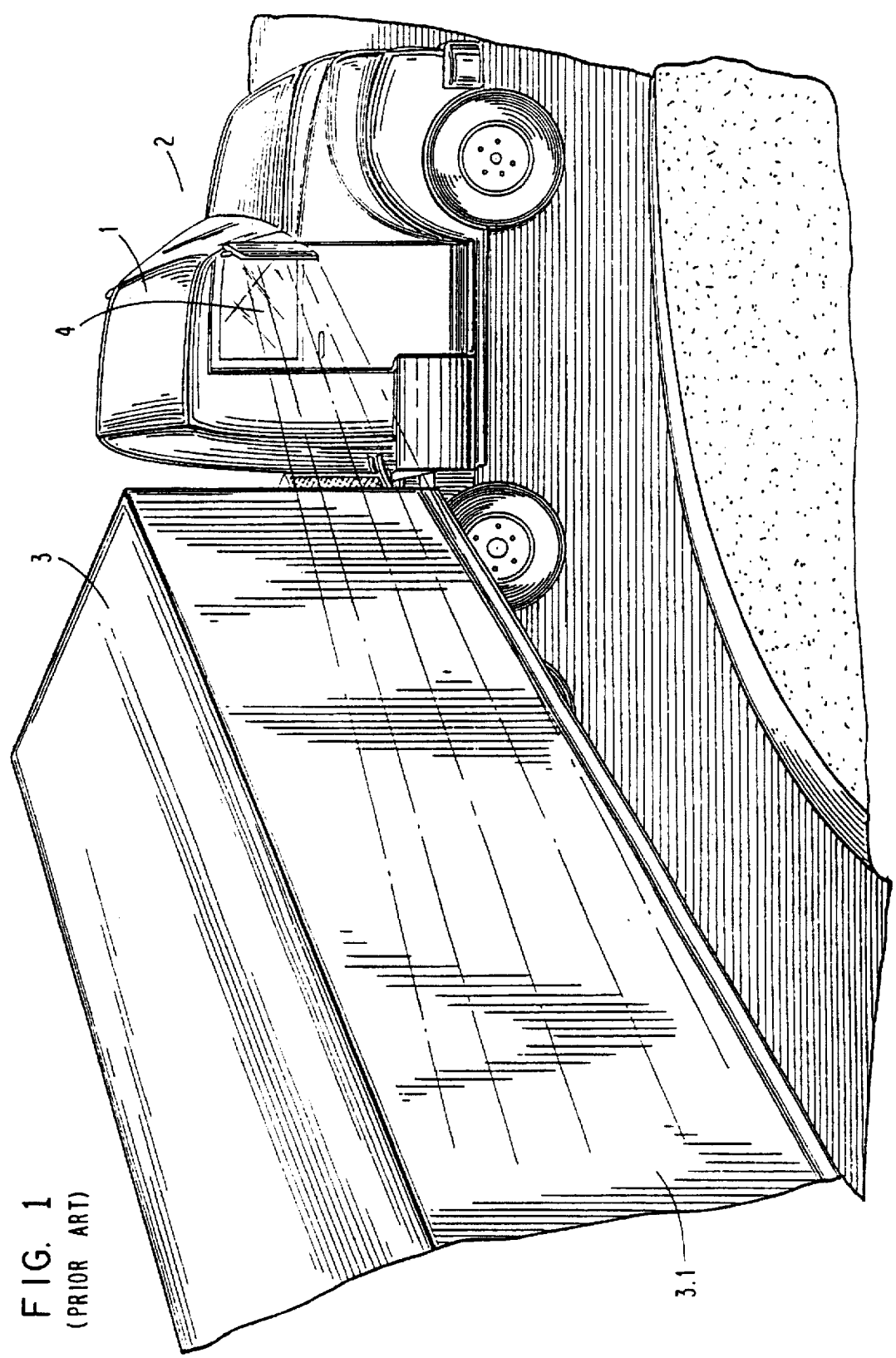
FIG. 1 is a prior art diagram illustrating a tractor-trailer turning a corner where an image of the side of the trailer is reflected onto the side view mirror.

The present invention is described with respect to a tractor trailer system as illustrated in prior art FIG. 1. However, the following embodiments of the present invention can be applied to any articulated vehicle. Conceivably, the present invention can also be applied to a non-articulated vehicle (such as an airplane or boat) under conditions in which the angle between a portion of the vehicle and a fixed object is critical so that mirror adjustment is required.

The most common use of the present invention is expected to be with tractor trailer rigs. While backing such vehicles at an angle, a variety of situations arise as depicted in FIGS. 21A–21O. As described earlier in this application, the vehicle driver often finds that the rear side corner (opposite the driver as depicted in FIGS. 21A–21O, and not shown in FIG. 1) of the trailer has been "lost" during the backing operation, and the driver is left with an image of some portion of the side the trailer reflected along viewing line of sight 4 onto side view mirror 2, leaving the vehicle operator with a view of only some portion of the side 3.1 of trailer 3. This problem has been addressed in the prior art, supra, through the use of side view mirrors 2 which are automatically adjusted in correspondence with the angle between the trailer 3 and the tractor 1. The aforementioned drawbacks of the prior art are addressed by the present invention which include side view mirror 2 as illustrated in FIG. 2.

The mirror 2 is supported by brackets 22a and 22b. The lower bracket 22b includes an electrical cable 23 which is preferably shielded along its entire length. Behind the surface of the mirror 25 and surrounded by housing 24 is contained a mirror motivating system. As depicted in FIG. 2, the mirror motivating system includes DC motor 26, reduction gear head 27, magnetic encoder 28 and proximity switch 29.

Figure 1A:
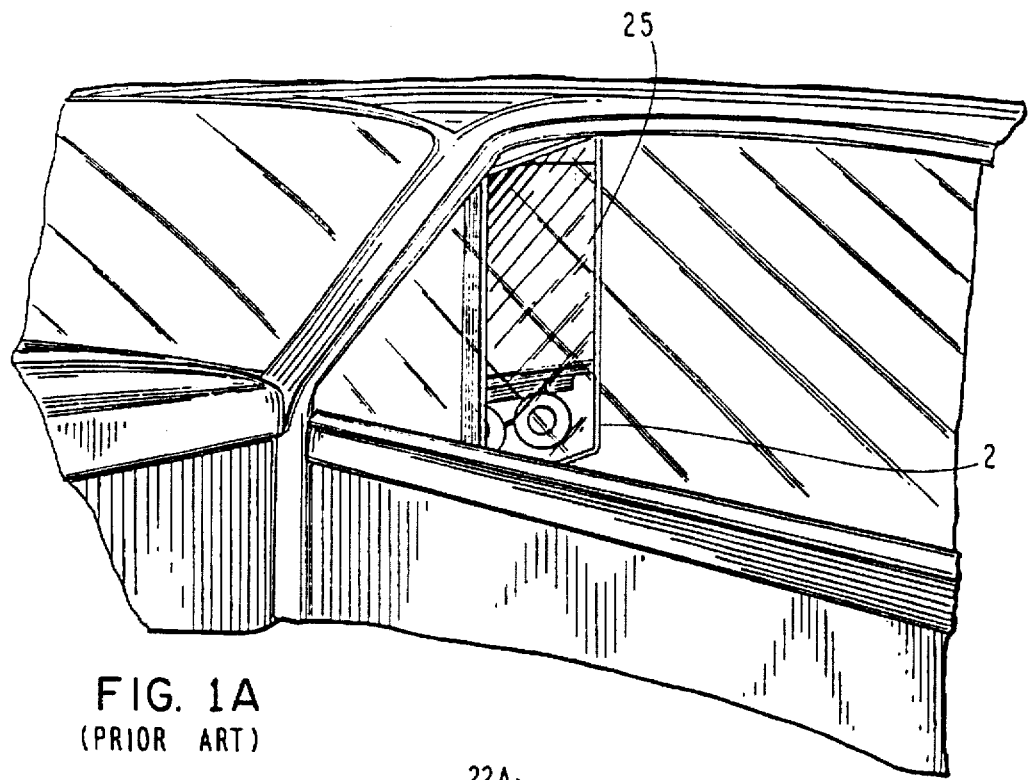
FIG. 1A is a diagram illustrating a driver's view of the front side of a trailer in a side view mirror.
Figure 2:
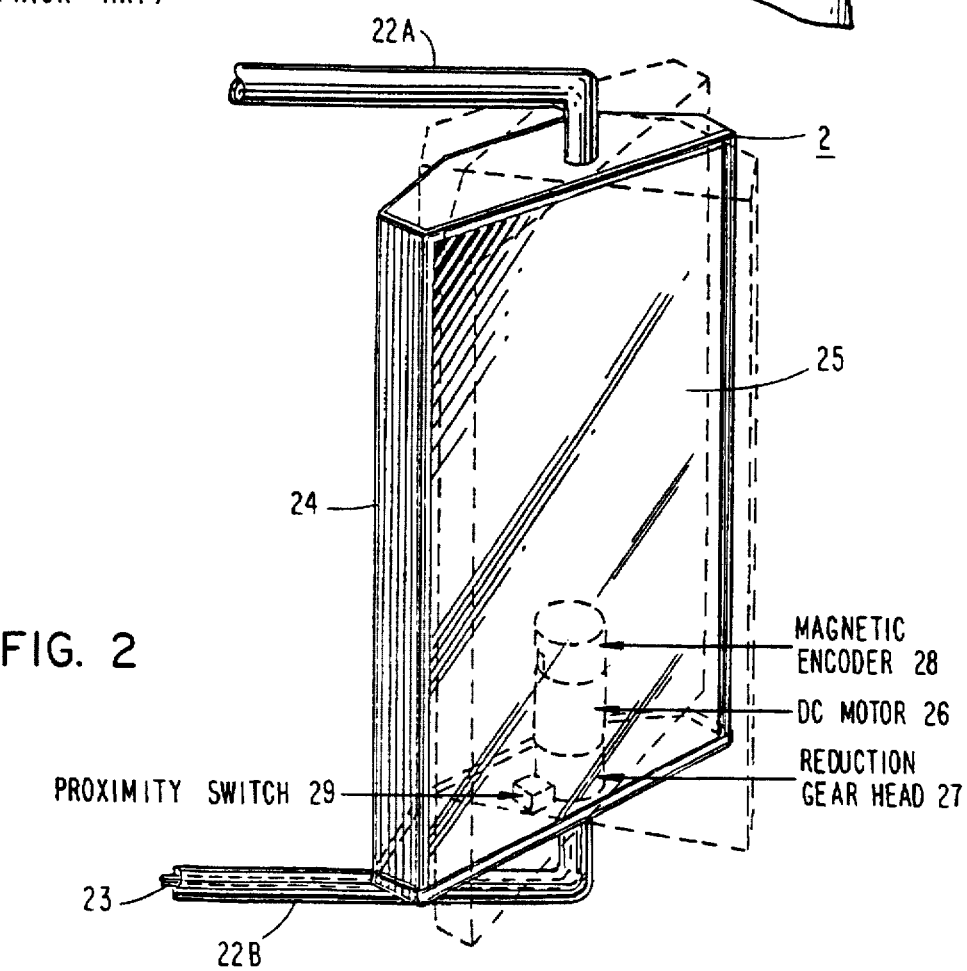
FIG. 2 is a diagram illustrating the interior of a motorized mirror, including the housings of the major elements contained therein.
Figure 3:
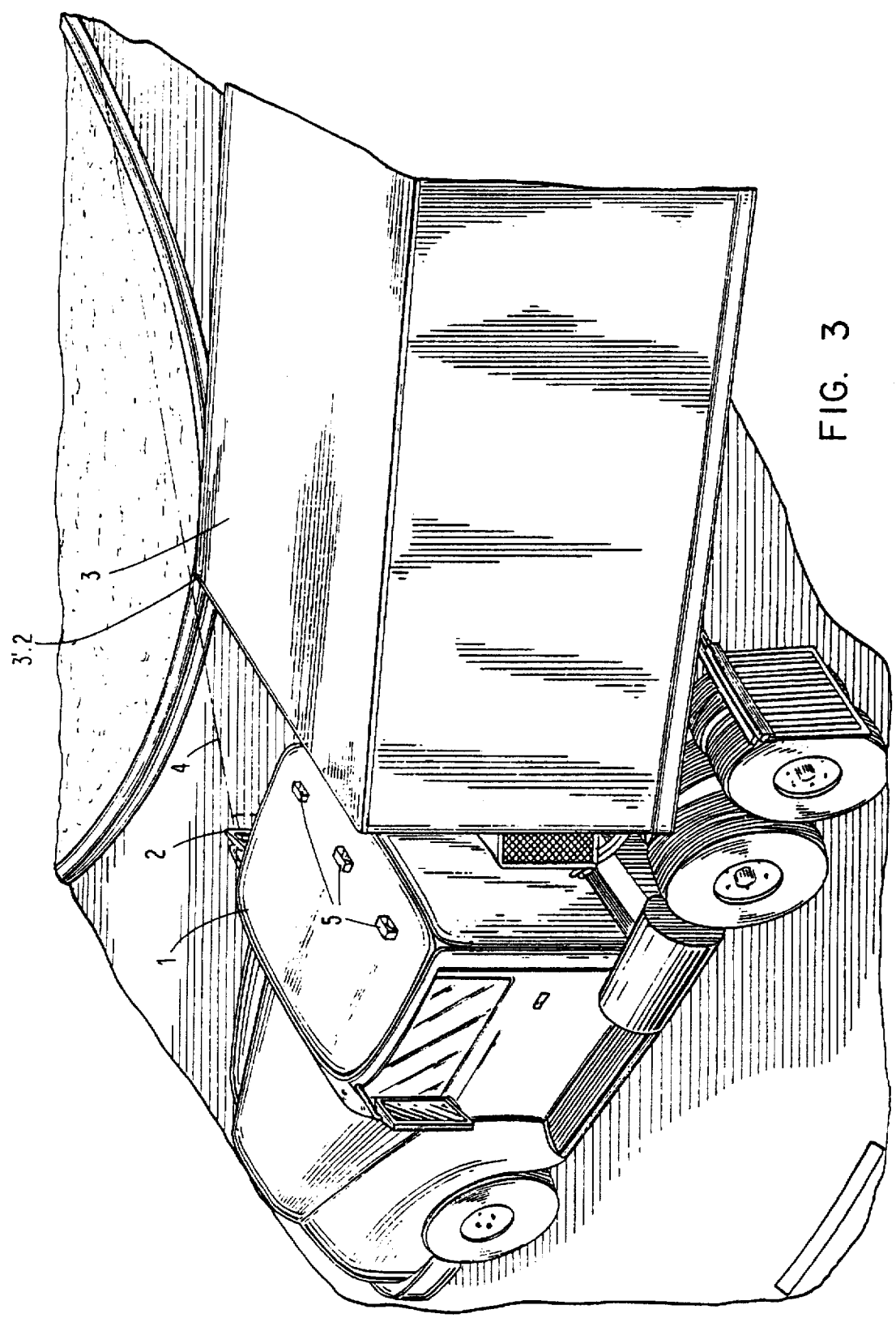
FIG. 3 is a diagram illustrating transducer mountings on the tractor of a vehicle employing a first embodiment of the present invention.

The mirror rotation range illustrated by the dotted line outlines of housing 24 in FIG. 2 permits the line of sight 4 to clear the corner of trailer 3'.2 as shown in FIG. 3. Thus, mirror 2 will be positioned to reflect an image of the rear side corner 3'.3 (shown in mirror 2 in FIG. 1A) of the trailer 3 to the driver in tractor 1.

The DC motor (in FIG. 2) is used, rather than a stepper motor, in order to provide the driver with manual mirror control. (The driver control device 60 is mounted as shown in FIG. 6C.) Further, a stepper motor would require a special modulated pulse to turn the motor and would have no holding torque once DC voltage was turned off. Reduction gear head 27 (of FIG. 2) is used in conjunction with the motor to provide high torque and holding power to increase the driving power of a small DC motor (such as 26 in FIG. 2), as well as to reduce the motor rotations per minute (RPM) to a manageable speed. As a result, in the present invention, the mirror 2 turns at a rate of between 1.5 to 3 RPMs, providing a smooth image transition as seen by the vehicle operator. The range of the mirror 2 rotation is shown in two dashed outlines at each extreme of the mirror's range. It is noted that any mirror moving unit (including any applicable motor) responsive to electrical control can be used in lieu of DC motor 26 if circumstances permit.

Encoder 28 in FIG. 2 is preferably a magnetic quadrature encoder, providing two sets of pulses in quadrature format in relationship to the mirror 2 position thus, providing accurate and repeatable positional control over an extended period of time. The magnetic quadrature encoder 28 provides feedback to the motor driver circuit 84 (in FIG. 13) so that the control circuit 81 has precise data as to the exact position of the motor 26 and thus, the mirror 2.

The magnetic encoder 28 is a magnetic reel rotating on the end of the motor shaft 73 (FIGS. 5A and 7) passed to Hall Effect transistors that provide higher reliability and less sensitivity to mirror vibration of alternative encoders, such as an optical encoder. In contrast, an optical encoder wheel contains small holes around the circumference of the encoder that could become clogged over time since the mirror housing 24 is not completely sealed from dust, soot and other environmental by products. Thus, an optical encoder is not considered suitable for many environments in which the present invention can be used. However, optical encoders can be used under some conditions, as can any other applicable feedback arrangement when circumstances permit.

As stated, supra, the quadrature encoder 28 uses two output channels in quadrature for position sensing. (This arranges transitions of the square waves of one channel occurring at different times to allow a count of the transitions and a view of the state of the opposite channel during the transitions.) Using this information, it can be determined if one channel leads the other so as to derive a direction of movement. Steady directional information is critical in the operation of the present invention due to the vibration inherent in almost any vehicle-mounted system. Thus, a single channel (tachometer-type) encoder should not be used since an error in count will occur should the encoder stop on a transitional edge of the signal. As vibration forces the unit back and forth across this edge, the counter will up-count with each transition even though the system is virtually stopped.

In contrast, quadrature detection on a two-channel encoder using the transition of one channel in its relationship to the state of the other channel results in reliable directional information. Once a quadrature signal is decoded, pulses of fixed duration at selected edge transitions within a cycle can be generated. These pulses can be fed via clockwise and counter-clockwise output lines to an up-down counter or programmable controller input port. It is noted that many controller and PC manufacturers include a quadrature detection circuit as part of their I/O electronics, along with the use of a two-channel quadrature input without further conditioning.

Quadrature detection from a magnetic encoder provides two pulses per channel per revolution of the motor. Since there are two channels, a total of four pulses are generated per revolution. If a gear reduction of 1000:1 is used, and the mirror turns at a speed of 3 RPMs, then the motor speed is 3000 RPMs. This arrangement will produce 1000 pulses per revolution or slightly more than two pulses per degree angle of turn, or roughly 28 pulses for each 10° of turn angle. With a high quality disk and properly phased encoder, the four times multiplied signal will be accurate to better than a half count. As a result of this arrangement, accurate positioning of the motor is part of the present invention, and provides smooth mirror movement. Consequently, the vehicle operator is not subjected to a bouncing or vibrating mirror image that is often conducive to eye strain.

Figure 7:
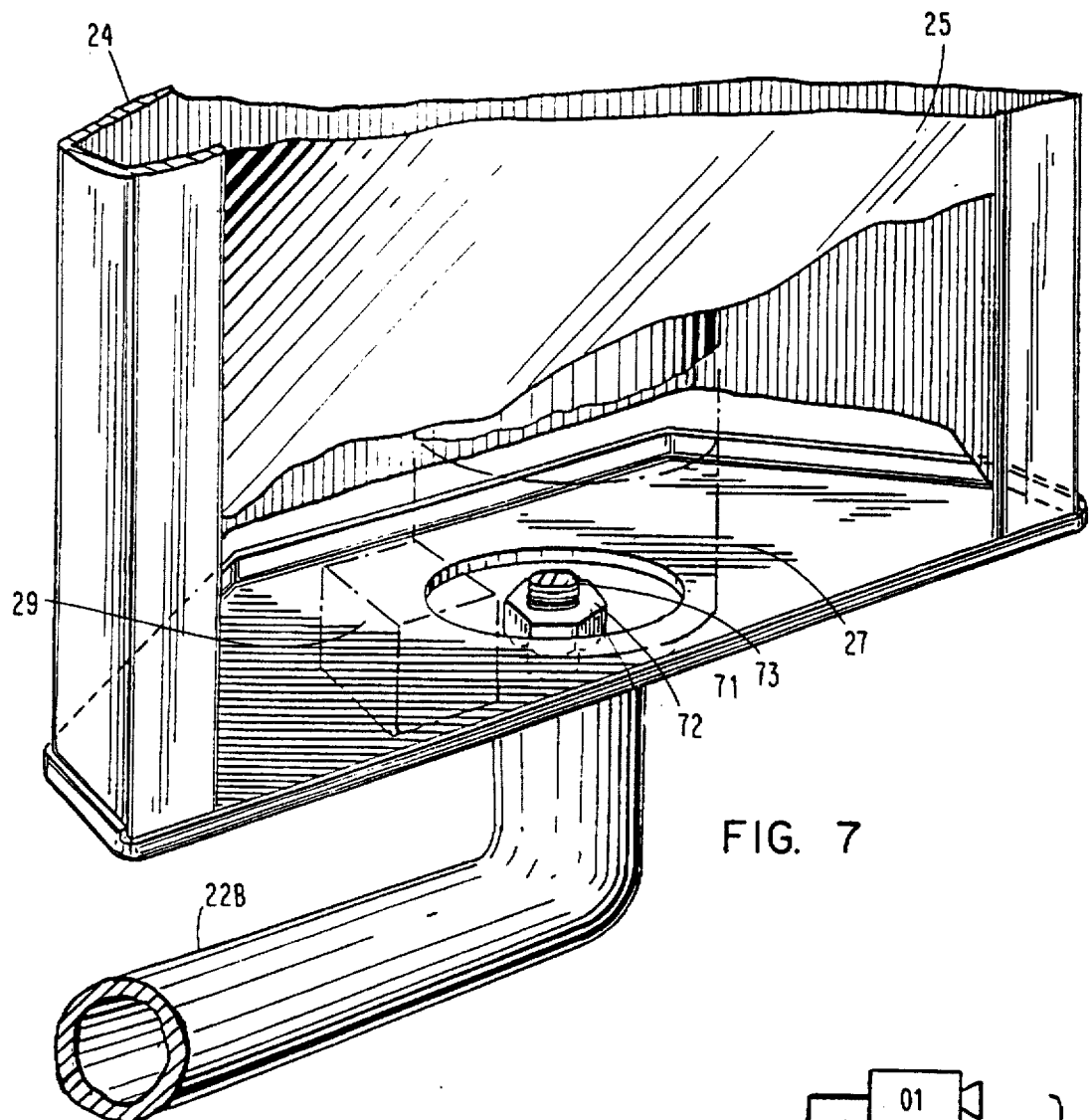
FIG. 7 is a diagram illustrating the relative positions of components within the side view mirror.

In order to properly orient the mirror 2, a proximity sensor and switch 29 are mounted adjacent to the reduction gear head. The proximity sensor and switch 29 can be mounted beneath the mirror housing 24 but are preferably mounted within the housing adjacent to the reduction gear head 27. An enlarged view of these two elements is illustrated in FIG. 7. The proximity sensor 29 is used to sense the mirror's position with reference to an adjustable stop. When the mirror 2 is turned to within 20 mm of this stop, the proximity sensor 29 sends a signal to the controller 81 (in FIG. 8). Thus, the mirror 2 is "homed" to a known position. The control system described, infra, uses this known position as an origin in the overall control scheme so that the mirror is always in the correct position with respect to other operating parameters.

Depicted in FIG. 7 is the opening 71 in the mirror housing 24 through which the control cables 23 (not shown in FIG. 7) pass to the motor. Also depicted is the pivot 72 connected to the motor shaft (not shown), about which the motor rotates the entire mirror housing 24.

Figure 8:
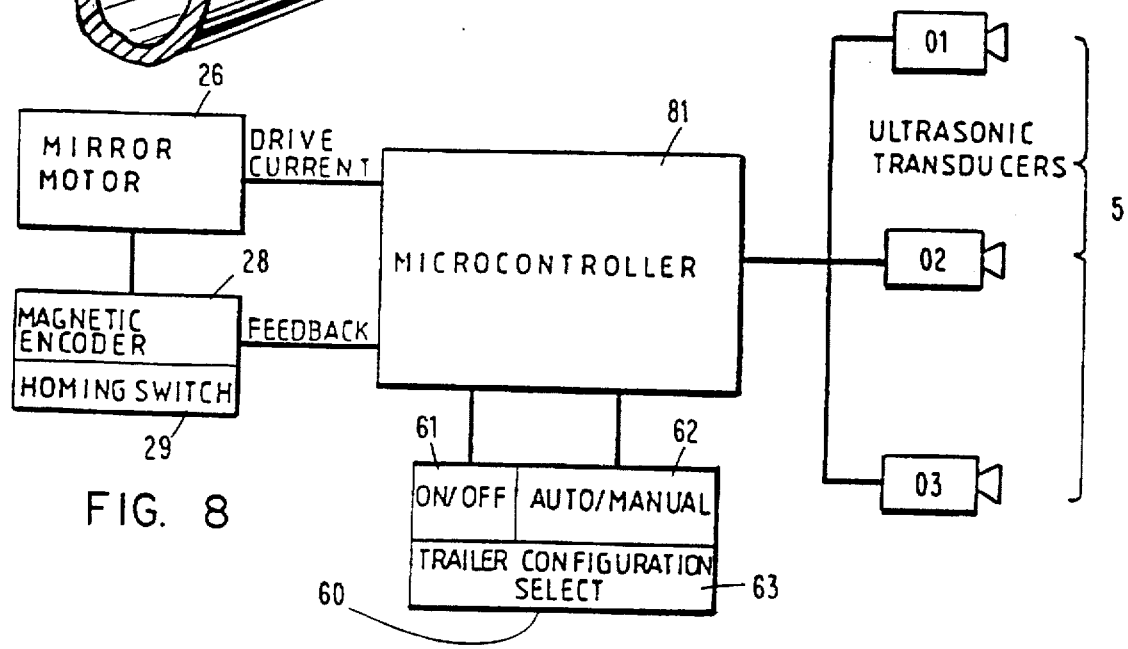
FIG. 8 is a block diagram of one embodiment of the present invention.

FIG. 8 is a block diagram illustration of a first embodiment of the present invention utilizing the aforementioned mirror structure and motivating system as illustrated in FIG. 2. The first embodiment includes at least three transducers 5 (indicated as 01, 02 and 03), and a microcontroller 81 to provide the automatic control of the mirror 2 based upon signals received from the transducers. A minimum of three transducers 5 (01, 02, 03), is necessary in order to calculate an accurate angle between the tractor 1 and the trailer 3 based upon distance measurement values derived from timing the echoes of each transducer. The microcontroller 81 correlates the calculated angle to a proper mirror position and sends the appropriate drive signals to mirror motor 26. An accurate indication of the mirror position is supplied to the microcontroller 81 by means of magnetic encoder 28. As previously discussed, proximity sensor homing switch 29 provides indication of an origin point from which the mirror is to be moved to a position corresponding to the calculated angle.

A control console 60, mounted in the tractor cab as shown in FIG. 6C, allows the vehicle operator to control certain aspects of the system operation. Using on/off switch 61, the system can be left on or entirely deactivated, allowing normal mirror adjustment by hand. When the system is activated by on/off switch 61, the vehicle operator can select either a manual or an automatic mode using switch 62. In the manual mode of operation, the driver can adjust the mirror by operating motor 26 manually from console 60. No such adjustment is needed or desirable in the automatic mode. Since the present invention is meant to be used in a variety of tractor-trailer configurations, different data regarding the different configurations will have to be used by the system in order to accurately calculate tractor/trailer angle with respect to the combination of distance measurements taken with the various transducers. Also, the possible use of more than three transducers would require a change in the configuration of the distance versus angle data used by the microcontroller 81.

The three major sub-assemblies are illustrated in FIGS. 6A-6C. In FIG. 6A, the mirror assembly 2 is arranged as previously described. FIG. 6B illustrates the arrangement of transducer 5 on the top of tractor 1. Each transducer is preferably connected via a shielded cable 69 to the control housing 60 illustrated in FIG. 6C. The housing 60 can be mounted beneath the dashboard 65 as shown in FIG. 6C, or can be located at any convenient position in the tractor cab. The housing 60 can be of virtually any configuration but should include at least an on/off switch 61, an auto-manual switch 62 and a configuration selection switch 63. An indicator light 66 is also preferred so that the vehicle operator can easily recognize when the system is active.

Figure 12:
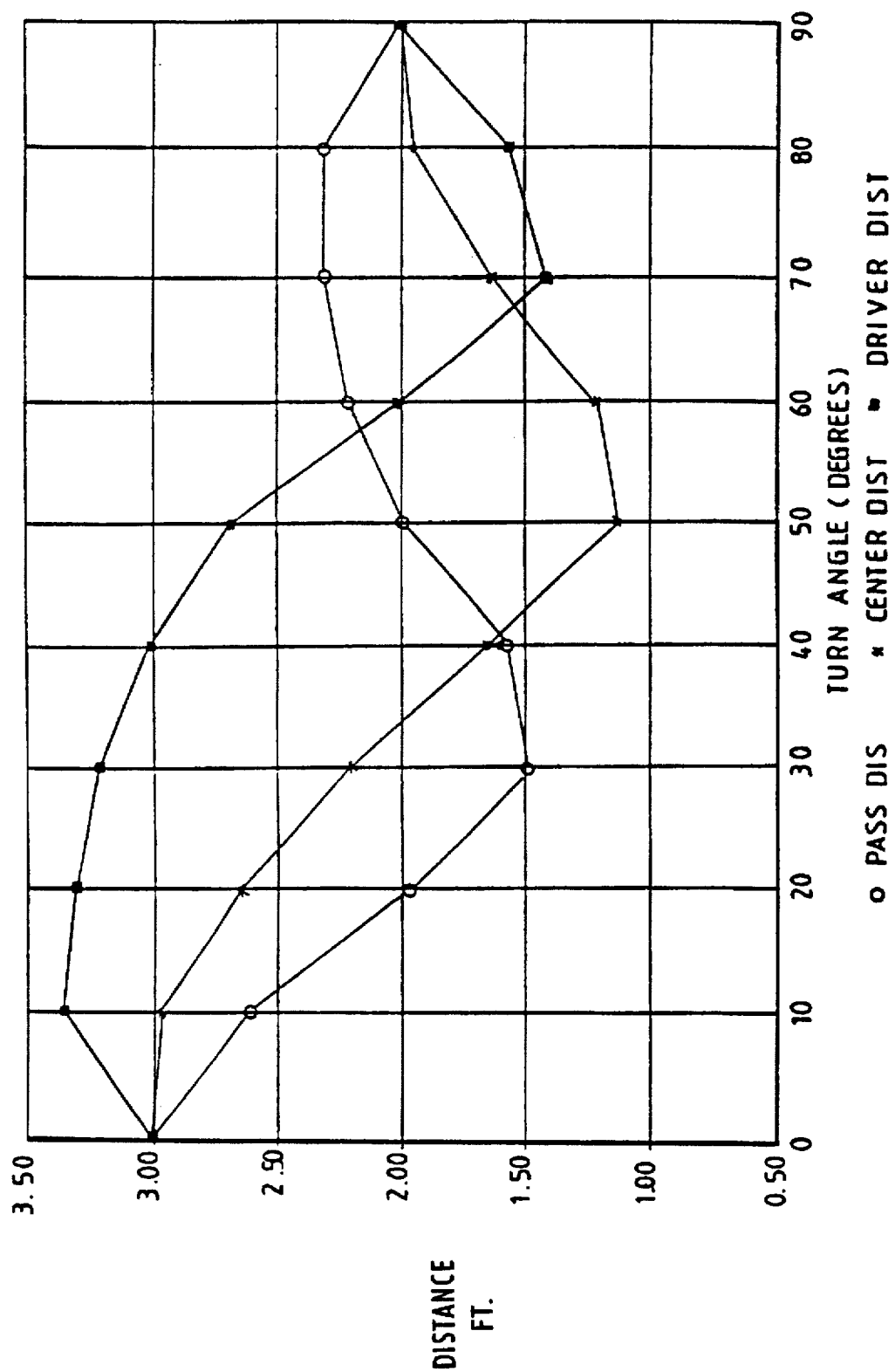
FIG. 12 is a graph of trailer distance versus turn angle for a plurality of ultrasonic sensors.

The chief distinction between the first and second embodiments of the present invention is the use of at least three ultrasonic transducers mounted on the tractor, and the use of a fluxgate compass mounted on each of the tractor and the trailer. In the first embodiment of the invention, the number and arrangement of the ultrasonic transducers is critical. This is not the case in the second embodiment which uses fluxgate compasses. The software arrangements differ for each embodiment. Thus, certain software filtering arrangements and distance versus angle tables as illustrated in FIGS. 11 and 12 which are critical to the first embodiment of the invention are not necessary in the second embodiment. However, the second embodiment does include a novel software filtering arrangement, and trades a simpler software arrangement for a more complex hardware arrangement. This includes the necessity of a signal carrying shielded control cable linking the fluxgate compass on the trailer with the control system within the tractor cab.

Figure 10:
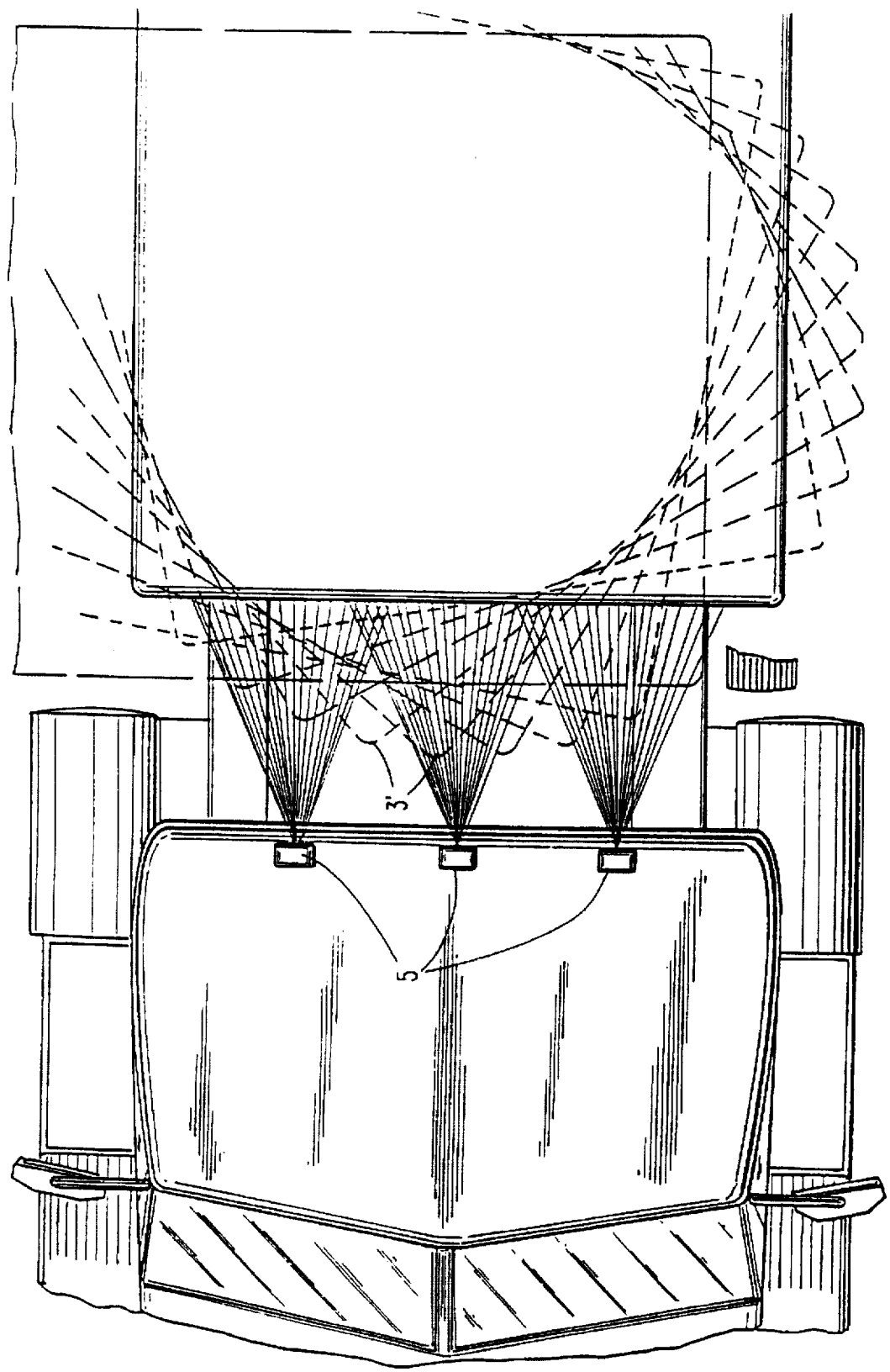
FIG. 10 is a diagram illustrating the radiation patterns of ultrasonic transducers for a first embodiment of the present invention.

The arrangement of the three transducers required for the first embodiment of the present invention is illustrated as element 5 in FIGS. 3, 6B and 10. In each of these drawings, the transducers are shown as being equal distantly mounted on the top of the tractor along its width. The transducers are shown as being at different distances from the rear wall of the tractor and are always relatively close to the rear of the tractor. The placement of the transducers on top of the tractor eliminates interference from wiring harnesses and air hoses connected between the tractor and the trailer. The tractor roof also has far less dirt and grease accumulation than the back of the tractor. Thus, the roof mounting results in less degradation of transducer performance.

When using a piezoelectric transducer, a minimum distance of twelve inches to an object is required to make a measurement. This is due to the transmitter's long "ring" time after the excitation pulse ends. Since its "ringing" would be picked up by the receiver, the input is blanked for an amount of time covering the transmitter ringing. This blanking time determines how close an object can be detected since it is the travel time of the ultrasonic pulses that is being used to measure distance. It is noted that some trailers come as close as six inches to the tractor when turns of 40° or more are being executed. Consequently, the transducers must be set back from the rear of the tractor by an appropriate distance as illustrated.

The transducers can be mounted on the upper third of the rear surface of the tractor if distances between the tractor and the trailer permit proper measurements (a distance of least twelve inches) throughout the full turning radius of the tractor-trailer rig. As previously stated, such rear wall mounting on the tractor is also contingent upon the environmental conditions with respect to dust, grease and fixtures between the tractor and the trailer.

A minimum of three transducers are used to measure distance with one located on the center line of the tractor and two of them positioned on either side, approximately two feet from the center line. Locating the side transducers two feet from the center line is done to maximize variation in measured distance between the transducers but also keeps interference from exhaust stacks located on the outside edge of the tractor to a minimum.

The relative position of the transducers with respect to a theoretical center line on the tractor is important since the distance versus angle tables (as illustrated in FIG. 11) used by the computer to calculate turn angle is based upon the transducers being positioned a certain distance apart. It is noted that different tables such as those illustrated in FIG. 11, can be selected by the microprocessor 81 (FIG. 8) or the system operator, based upon different transducer spacings, different tractor trailer spacings and different numbers of transducers (greater than three).

One example of ultrasonic transducers that can be used are piezoelectric devices from Murata Erie, No. MA40E7R/S, or Polaroid, No. 9000. Such transducers are sealed and designed to handle high vibration, shock, extreme temperatures and weather conditions that would exist around the exterior of a truck. Electrostatic transducers (or any other ultrasonic signal generating/receiving device) can be used in the present invention instead of piezoelectric transducers. However, the delicacy of existing electrostatic transducers render their use on the exterior of a tractor/trailer problematical.

Preferably, the piezoelectric transducers will have a full beam width of 15° along the vertical axis and 40° along the horizontal axis. This results in an elliptical radiation pattern, as illustrated in FIG. 20A. The width of the beam from each transducer is approximately five feet. The radiation pattern of three transducers mounted along the rear of the tractor 1 is illustrated in FIG. 10. When the tractor and the trailer are lined up (0° turning angle) the radiation pattern is uniform. However, as the angle between the tractor and the trailer 3 increases, the pattern of radiation impinging on the trailer becomes irregular, as indicated by the multiple dashed outlines of the trailer. The aforementioned radiation patterns from the transducers is effected by the transducers being mounted in a rubberized beam-forming acoustic horn, thereby increasing sensitivity and reducing mechanical resonances in the operating frequency range of 40 KHz. To fully utilize this beam pattern, the transducers are raised up from the roof by approximately two inches or more, depending on how far back they are placed from the rear of the tractor. This is done to maintain a 7° "look-down" angle (with respect to the horizontal plane). It is noted that obstructions such as airfoil brackets and horns must also be kept out of the 40° horizontal beam path.

Since there are many tractor-trailer configurations, more transducers can be added to eliminate any ambiguity in measurement (caused by obstructing structures on the tractor-trailer) that cannot be resolved with three transducers. Each transducer is preferably connected to the computer via a shielded conductor 23 (in FIG. 2) to eliminate false indications in the pulse echo detection circuits caused by external interference or other environmental factors.

Figure 13:
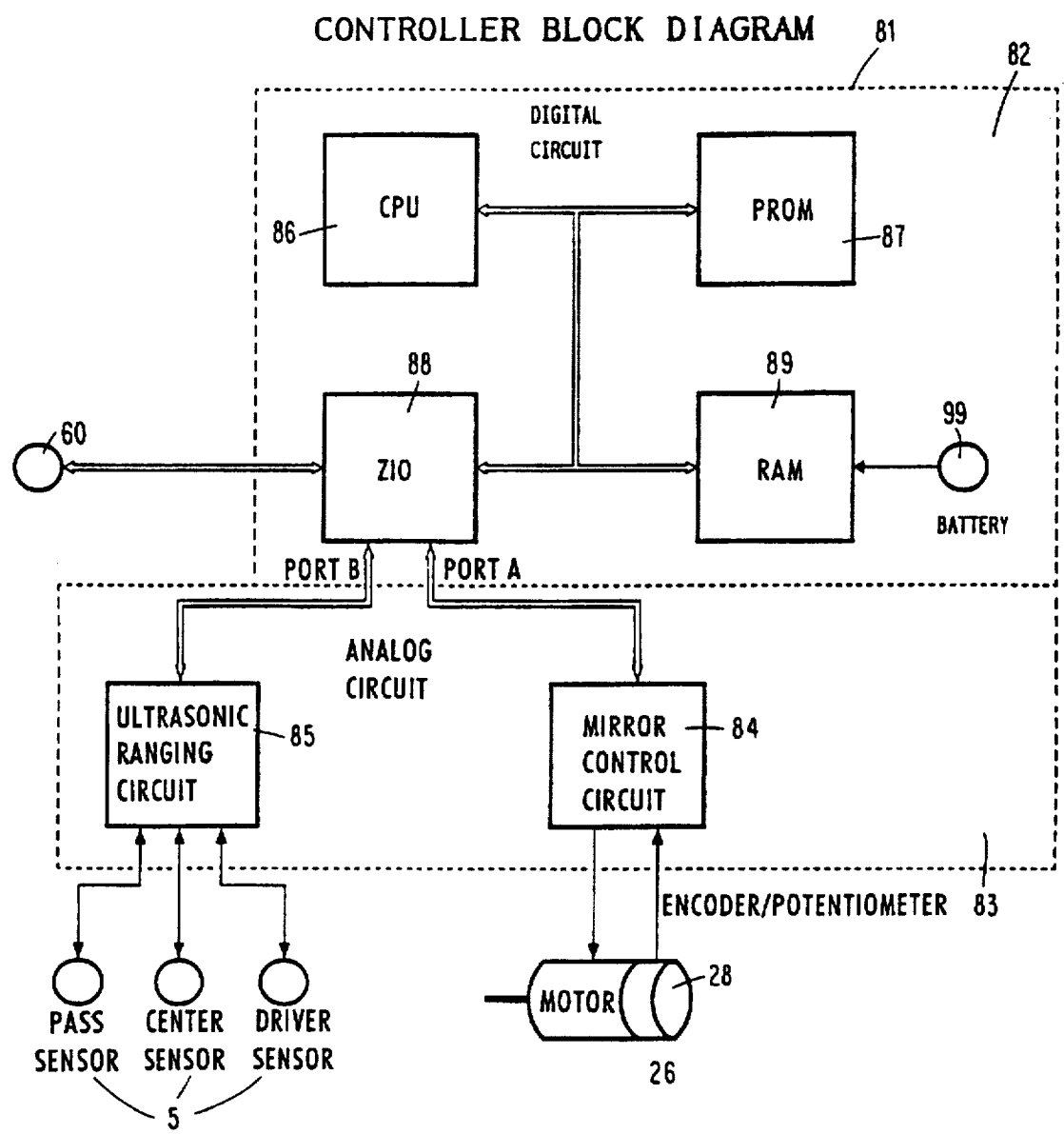
FIG. 13 is a block diagram illustrating elements of the controller.

Microcontroller 81 (in FIG. 8) is illustrated in greater detail in FIG. 13. The digital portion 82 of the microcontroller 81 is constituted by a CPU 86 which relies upon both a PROM 87 and a RAM 89 for memory capacity. An input/output processor 88 handles input signals from the ultrasonic ranging circuit 85 and outputs control signals to the mirror control circuit 84. The input/output processor 88 also receives control signals from the control console 60, previously described. The analog portion 83 of the microcontroller 81 includes the ultrasonic ranging circuit 85 and the mirror control circuit 84. CPU 86 handles all the calculations and driver interface controls.

One example of the microcontroller is a Zilog Z80180 microprocessor that uses 32K of ROM and 32K bytes of battery-backed RAM, as well as a Z84C9010 input/output integrated circuit. Two 8-bit ports from I/O integrated circuit are configured to handle all inputs and outputs from the mirror control and transducer circuits.

The ultrasonic transducer circuits 85 can be constituted by Texas Instruments Sonar Ranging Control Integrated Circuits, TL852 and TL853, along with some discrete components. The TL853 provides sixteen 40 Khz transmit pulses at a level of 40 volts, receiver blanking time and digital gain control for receiver TL852. The TL852 provides variable gain, variable bandwidth amplification and echo detection circuits. Initiation of the transmit and blanking time to the TL853 as well as measurement of Sonar echo return time is all controlled by the CPU 86.

During power-on, the microprocessor 81 first initializes variables that are used in the distance measurement routine and some unused I/O ports and counters. Next the processor "homes" the mirror to determine its position and checks the external control setting used by the driver to change the operating mode when proximity sensor/switch 29 is used in the system.

If the driver-operated control is set to the automatic mode, the CPU 86 downloads a distance versus turn angle table from PROM 87 and proceeds with the transmit timing sequence of the ultrasonic transducers. When in the manual mode, the driver can change any of the setting for the mirror position or trailer angle, or have the processor recalculate a new distance versus trailer angle table. Operator participation is normally required to manually input a new distance versus turn angle table. The PROM 87 is in a socket so it can be easily changed to update software and add new distance versus turn angle tables.

When the distance measurement sequence starts, CPU 86 compares the incoming numbers against the distance versus turned angle table that has been selected. The three transducer measurements are taken in a sequence separated by approximately 50 to 100 msec preventing one transducer from detecting another transducer's transmitted signal. A software filter described, infra, eliminates questionable distance measurements caused by missed or false sonar echoes. All three inputs (taken each measurement sequence) must fall within a predetermined range of values from the distance versus turn angle table before a corresponding mirror angle is sent to mirror control circuit 84. If the mirror is already at the angle selected from the table, no movement of the mirror occurs, and the distance measurement sequence goes through another cycle.

The mirror control circuit 84 can be constituted by Hewlett-Packard HCTL-2016 quadrature decoder/counter interface circuit, an Allegro 2998 dual full-bridge motor driver circuit connected to the motorized mirror, and a comparator for motor overcurrent protection. The overcurrent circuit warns microcontroller 81 that there is an obstruction preventing the mirror from rotating since the motor current increases under a heavy load. A current of 265 ma is considered high for these motors, and constitutes the level at which the comparator will switch power from the motor.

During the mirror adjustment operation, the mirror control circuit 84 receives a set of pulses from the encoder 28, where the pulses are aligned in quadrature format. (Quadrature format is one in which the pulse on input A leads the pulse on input B by half a cycle when the motor turns in one direction and vice-versa when the direction is reversed.) This will cause the mirror control counter to count up when the motor turns clockwise and count down when turning counter clockwise.

The aforementioned components are specified only by way of example, and to indicate that the present invention has been constructed and is operable. Specific circuit arrangements and wiring diagrams using the aforementioned components are found in Appendix I attached hereto. This Appendix is not definitive of possible circuit and wiring arrangements used to carry out the present invention, but only serves as an example of one manner in which the skilled practitioner would effect operation of the present invention.

Figure 14:
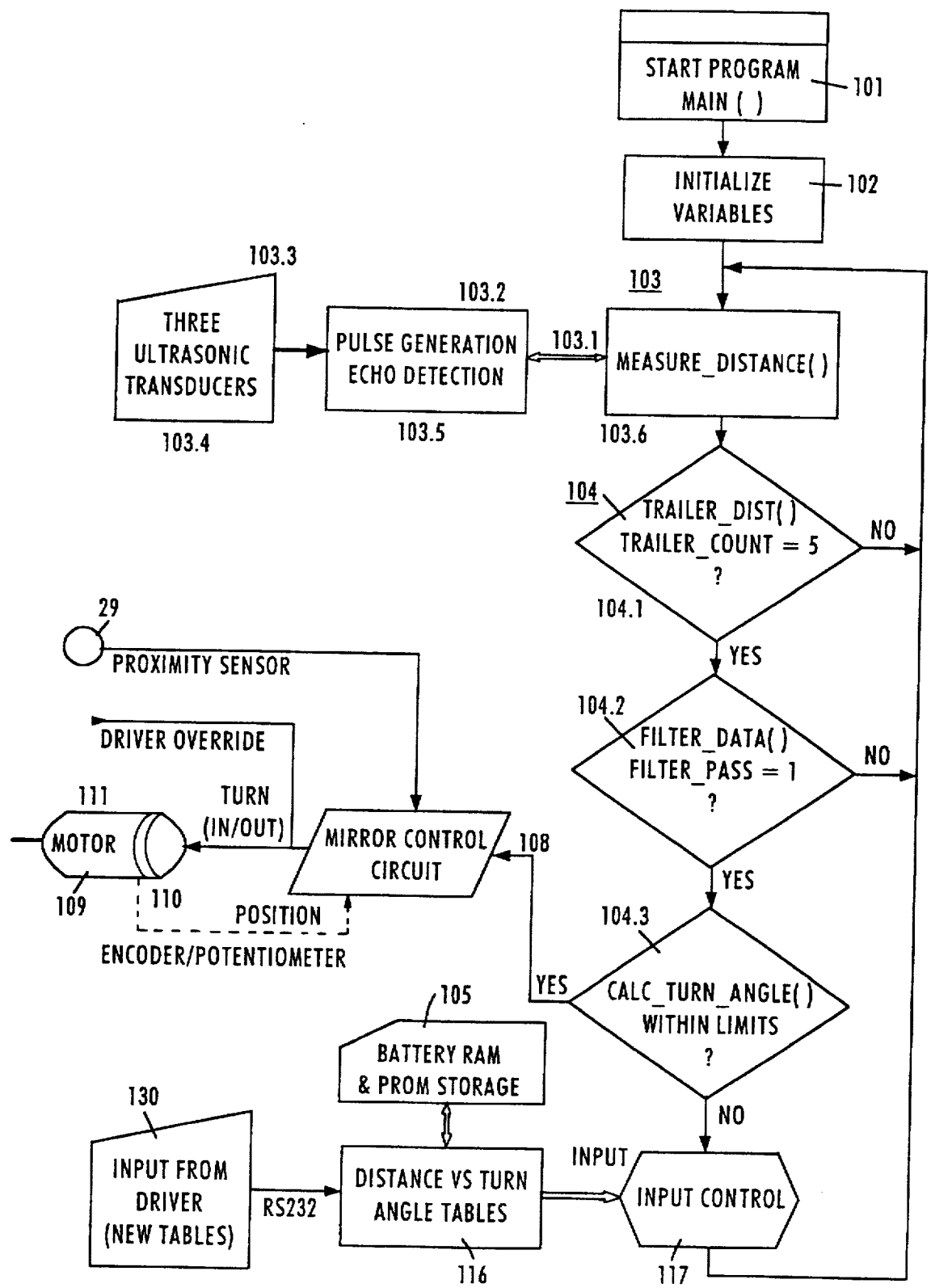
FIG. 14 is a flow chart illustrating the general operation for one embodiment of the present invention.

The operation of the system illustrated in FIG. 13 is illustrated by the flow diagram of FIG. 14. At step 101, the driver activates the system, selects the mode of operation, and determines which of the distance versus angle tables will be downloaded from EPROM storage 105. Upon selecting automatic operation, the program is started. At step 102, the system initializes variables so as to obtain correct orientation of the mirror and other parameters of the operating system.

In order to adjust the mirror, the angle between the tractor and the trailer must be calculated. For this to be accomplished, the distance between each of the transducers and the front of the trailer must be measured as indicated at step 103. This step includes several sub-steps necessary to obtaining a valid measurement. First at sub-step 103.1, the timer sequence is initiated so that each of the transducers sends and receives an ultrasonic signals within a predetermined non-overlapping time frame. At step 103.2, control signals are generated to activate an ultrasonic transducer for irradiating an ultrasonic beam and receiving the echo of that beam from the front of the trailer. At step 103.4, the echo is detected by the same ultrasonic transducer, and at sub-step 103.5 information indicative of the echo return time is translated into a distance measurement. At sub-step 103.6, the calculated distance is checked against predetermined limits to determine if a valid signal has been received. If no valid signal is determined to exist, the process returns to the beginning of the distance measurement sequence at step 103.1.

Figure 17:
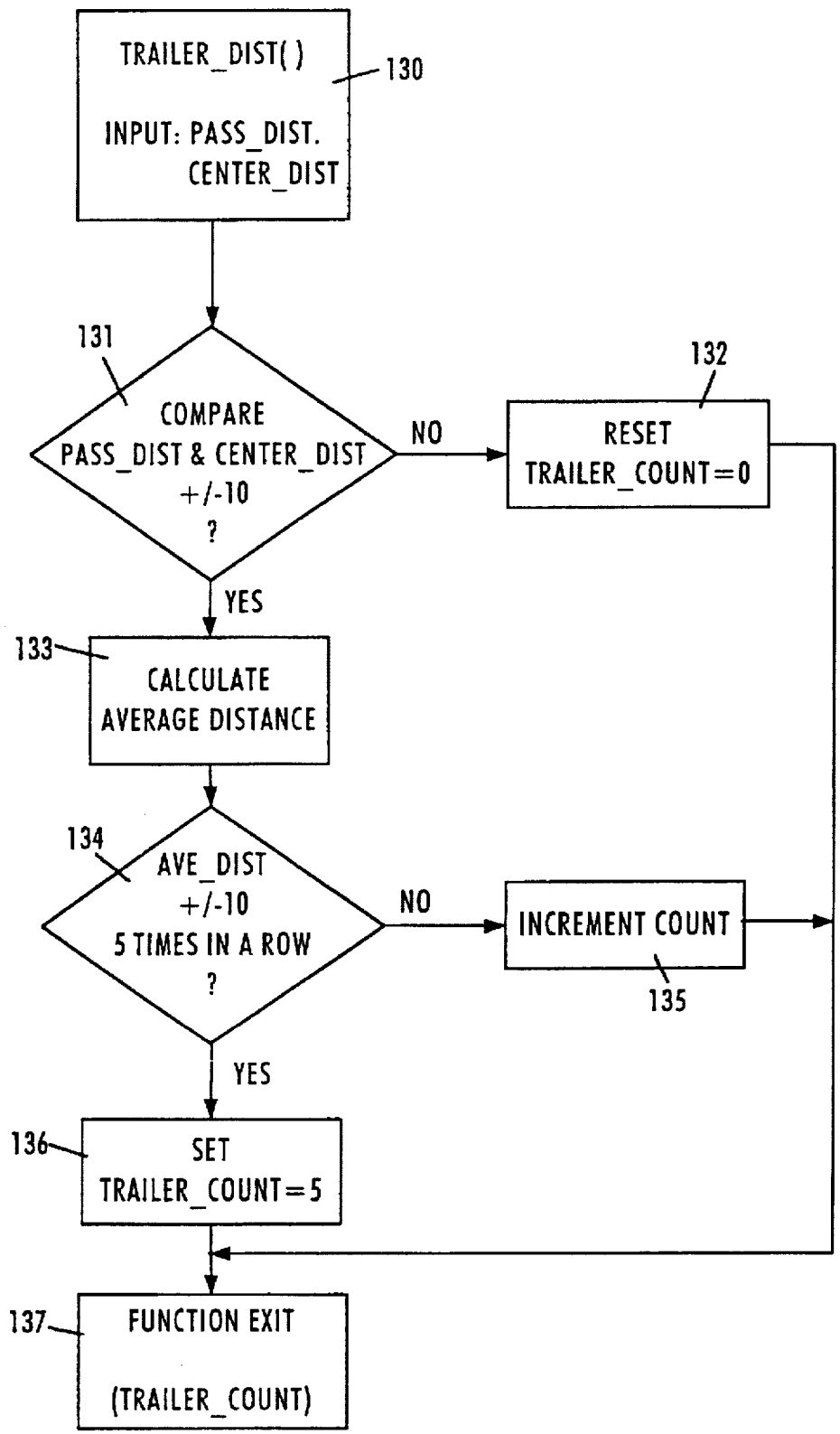
FIG. 17 is a flow chart of the process for determining an acceptable average measurement for trailer distance.
Figure 18:
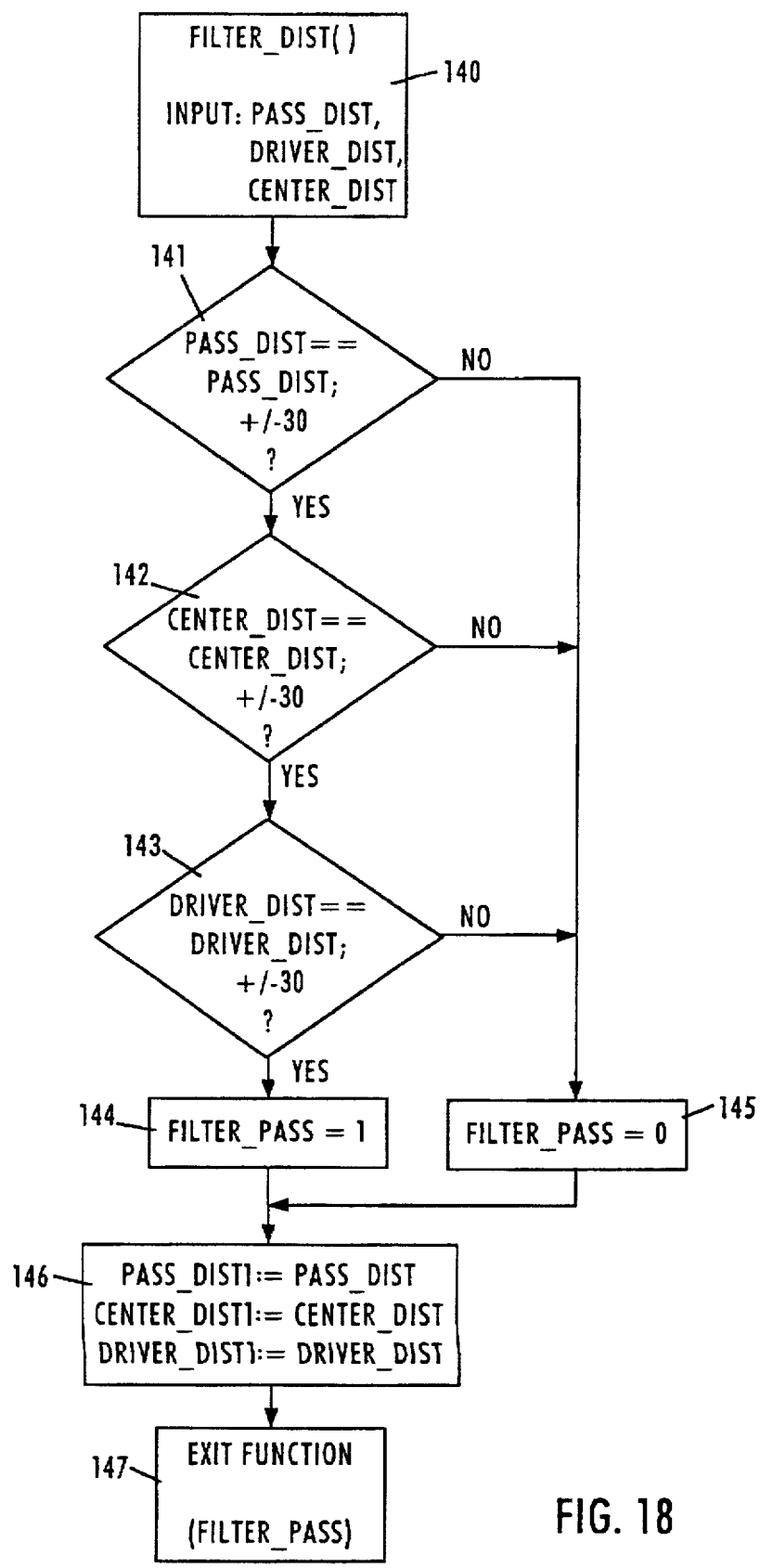
FIG. 18 is a flow chart illustrating the process of determining the viability of individual transducer measurements.
Figure 19:
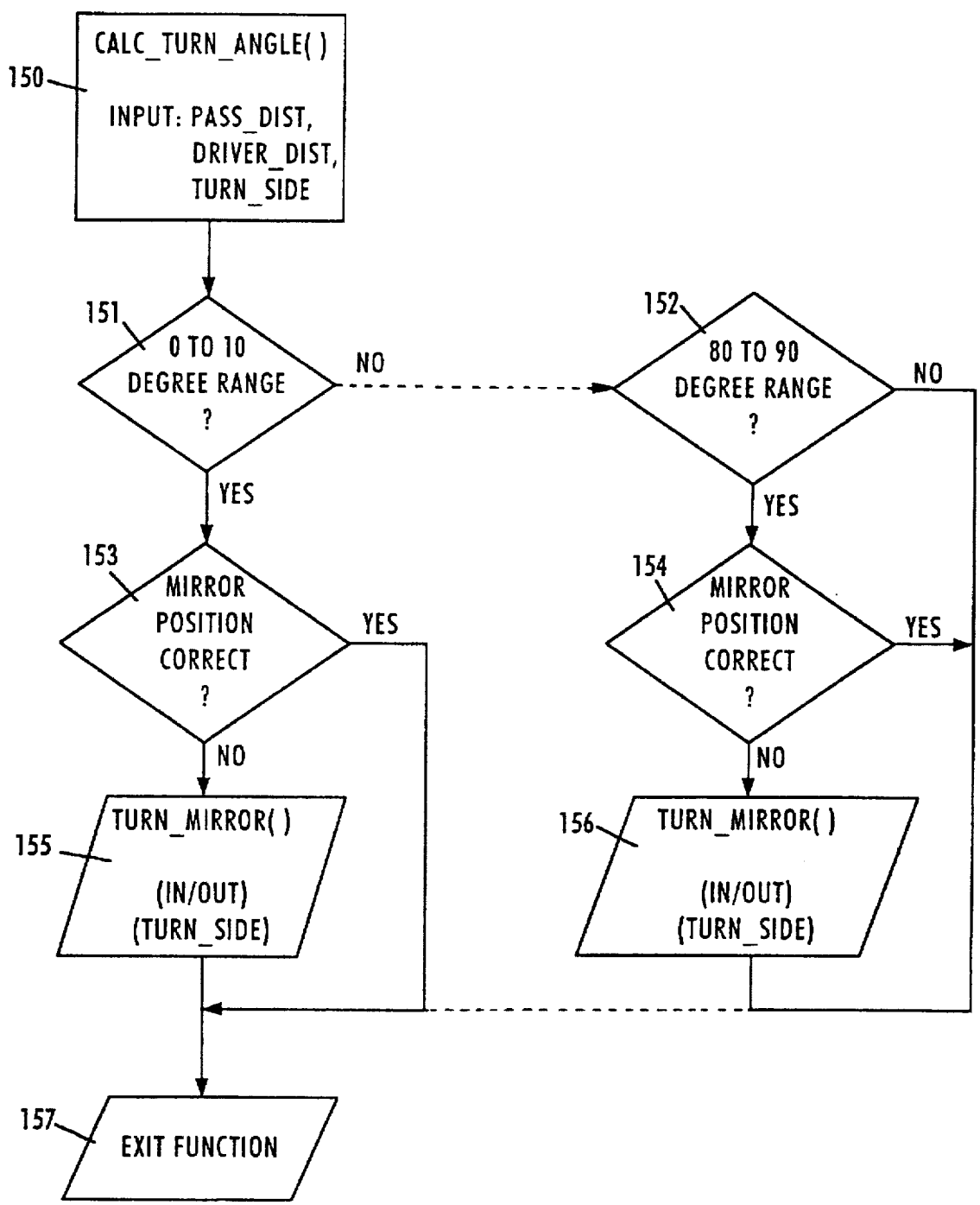
FIG. 19 is a flow chart illustrating the process of determining if predetermined limitations are met for mirror movement.

If a valid signal is determined to exist at step 103.6, the turning angle between two portions of the articulated vehicle is determined at step 104. This step includes the substeps 104.1, 104.2 and 104.3. Each of these substeps is illustrated at FIGS. 17, 18 and 19, respectively, and will be described in greater detail infra. A valid signal is determined by the filter data function (step 104.2) before it is passed onto the turn angle function (step 104.3). If the filter data function finds a change in measured data greater than plus/minus 30 from the previously measurement, a new measurement is then required.

For the first embodiment of the present invention, Tables 1-3 of FIG. 11 are used to correlate distances measured by the three sensors with the turning angle between the tractor and the trailer. It is noted that the first embodiment of the present invention can include more than three piezoelectric emitter/sensors, three being the minimum. It is also noted that while piezoelectric transducers are used in this embodiment of the invention, other similar emitter/sensor arrangements can be used where the environment containing these sensor/emitters is appropriate.

Table 1 correlates the distance of each sensor (mounted on the tractor) from the trailer to the angle of turn between the tractor and the trailer. Table 1 is set of for a distance of 4 feet between the sensors and the trailer when the trailer and tractor are in alignment with each other (a turning angle of 0°). Table 2 correlates the turn angle between tractor and trailer with the reception time of each of the sensors. The reception time is based upon a system crystal clock frequency of 9.212 mHz. Table 3 correlates the turn angle between the tractor and the trailer based upon a change in distance from the zero angle value (when the tractor and trailer are aligned with each other). Since the tables are size-dependent, as well as dependent upon the distance between the tractor and the trailer, different tables are required for different tractor-trailer configurations. New tables are input by the driver or operator as illustrated at step 100 in FIG. 14.

The proper distance versus turn angle tables for the present tractor/trailer arrangement is entered at step 106 in conjunction with support provided by the PROM storage illustrated as step 105 in FIG. 14. The appropriate data from the tables is input at step 107 to a controller to be incorporated into the calculation of the turn angle based upon current distance measurement. This data is incorporated into the turn angle calculation sequence 104 (including steps 104.1, 104.2 and 104.3), which also uses data derived from the distance measurement step 103 (which includes substeps 103.2, 103.3, 103.4, 103.5 and 103.6).

In the first preferred embodiment, the three transducer measurements are taken sequentially and are separated by at least 50 msec and up to 100 msec, to prevent one transducer from detecting the previous transmitted signal of another transducer. This function is part of the distance measurement step 103 in FIG. 14. The distance measurement step, constituted by substeps 103.1–103.6, is performed each time the system requires an indication of the current angle between the tractor and the trailer. As will be illustrated by FIGS. 17–19, infra, a plurality of such measurements are taken for each transducer to derive an effective average of the current distance measurements thereby, providing an accepted measurement for each transducer to be used in deriving an angle measurement from the table currently being used. A more detailed sequence of the distance measurement step process is illustrated in FIG. 16.

Figure 16:
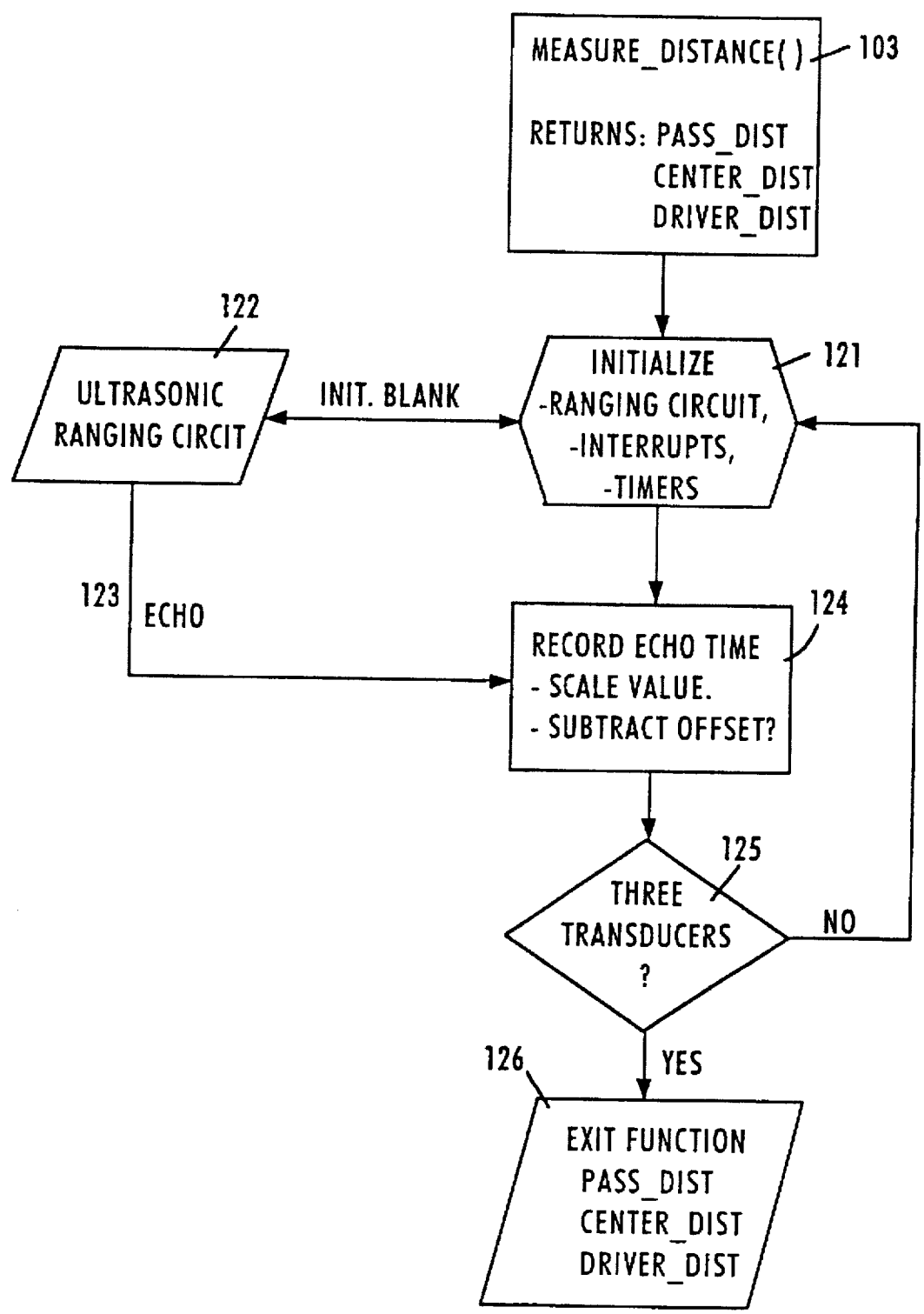
FIG. 16 is a block diagram illustrating the steps in measuring the distances for three transducers.

As illustrated in FIG. 16, the distance measurement process begins at step 103, at which separation is made between previously transmitted and received signals and those which are to be transmitted for the present sequence of measurement. The system is initialized in a well-known fashion resetting the ranging circuit, interrupts and timers in order to properly sequence the operation of each of the ultrasonic transducers and incorporate the separate measurements into the following software filter sequence and turn angle calculation process. Each ultrasonic transmitter is initiated and then blanked at step 122. As represented at step 123, the same initiating and blanking sequence is used for each of the ultrasonic transducers to receive a reflected signal initiated by that transducer. The time between the transmission and reception of each of the ultrasonic signals is determined at step 124, and adjustments are made for the offsets caused by the physical mounting of the transducers, as well as the scale value based upon the number of transmissions and receptions previously made. At step 125, a check is made to determine if all three transducers have provided signals rendering time and thus distance information. If not, the sequence is repeated until signals from all three transducers are recorded. Once this has been done, the next portion of the measuring sequence is begun as explained, infra, with respect to FIGS. 17–19.

The distance measurement for each of the three ultrasonic transducers is put through a software filter routine to eliminate anomalies, and to ensure consistent measurements. The first two portions of the software filter, as illustrated in FIGS. 17 and 18 are used only with the first embodiment of the present invention while the process of FIG. 19 is used with both embodiments of the present invention.

The purpose of the process depicted in FIG. 17 is to calculate trailer distance (trailer dist). This is the average distance between the tractor and the trailer when in a straight line. This value is stored in the memory (preferably RAM 89 of FIG. 13), and is used to calculate turning angle as described, infra. A trailer distance must be recalculated when a system is reset for a different tractor-trailer configuration. This value is determined through the use of the distance measurements (from the passenger transducer to the trailer, from the center transducer to the trailer and from the driver side transducer to the trailer) at any given moment as derived in the FIG. 16 process. The three measurements are made at least twenty times a second and are compared to a table of numbers (Table 1 in FIG. 11) that is normalized to the trailer distance (as calculated in FIG. 17). This normalization allows the turn angle table to be used with various distances between the tractor and the trailer.

The process depicted in the flow chart of FIG. 17 tests for five consecutive measurements if the average distance between the passenger transducer (and the trailer), and the center transducer (and the trailer) are within ±10 counts (10%) of each other. (It is noted that each count is a predetermine sub-division of the normal clock cycle of the microprocessor 81.) A comparison of the passenger sensor distance versus the driver sensor distance can also be used but is not necessary when the trailer is in a straight line with the tractor. When 5 consecutive readings have been made falling within the prescribed limits, the trailer count (as indicated in the flow chart of FIG. 17) is set to "5" and this function is bypassed until the program is reset, and a new group of distance measurements taken to account for an additional change in the angle between the tractor and the trailer.

To simplify the averaging routine, only two measurements (passenger distance and center distance) are used to determine the average distance (trailer distance). Once the average distance is determined, an offset is added to the two inputs when larger distance measurements are made to equalize all three transducers.

As depicted in FIG. 17, two measurements from two of the three (or more) transducers obtained after all of the transducers have provided measurements, are input into that part of the microprocessor 81 (FIG. 13) having means for accepting the subject signals and carrying out these steps following from input step 130. At step 131, both the passenger sensor distance and the center sensor distance are compared for any deviation of greater than 10 counts (approximately 10%) from the last such measurement. If such a deviation is detected, a reset step at 132 is carried out and no increment is made to the overall trailer count of the processor necessary for the completion of this process. If, on the other hand, both distances are within the predetermined parameters (less than 10% deviation from the previous measurement), an average distance of the two distance measurements is calculated. If this average distance, calculated at step 134, is within 10 counts (or approximately 10%) of the last calculated average distance, determination is made if this condition has been met 5 times in a row. If so, the trailer count is set at 5 (step 136) and, the measurements taken are deemed to be acceptable for use in the next process of the software filter. If the average distance has not occurred within acceptable parameters 5 times in a row, and the current average distance is within acceptable parameters, the trailer count is incremented at step 135. As a result, the next comparison will be made at an additional trailer count.

After the process of FIG. 17 is carried out, the sequence of FIG. 18 is begun at step 140. At steps 141, 142 and 143 the most recent reading for each of the transducers (as accepted in the processes of FIGS. 16 and 17) is compared to the previous reading. If a deviation of less than 30% is found for each of these transducers, the signals are judged to pass the test as indicated at step 144. If on the other hand the deviation of 30% or greater is found, the test has failed as indicated at step 145, and a new reading is taken. When the test is passed at step 144, the previous readings used for comparison are reset to reflect the most recent readings for each of the transducers, as indicated at step 146. At step 147, the signals are passed to the next sequence of the filter algorithm.

Once the distance measurements (passenger distance, center distance and driver distance) are determined and Table 3 of FIG. 11 normalized based upon the trailer distance, and an attempt is made to match the distance measurements and the turn angle table to determine the change in mirror angle. If a match is not found, a new set of distance measurements will be taken, and no change in the mirror position will be made. No tolerance levels are used when making this comparison. However, a hysteresis of five counts is subtracted from the previous turn angle calculation to prevent an oscillation between two angles when the distance measurement changes by only a few counts and falls intermittently in two turn angle windows. To obtain the turn angle windows, each valid distance from each of the transducers is compared to a value equal to the trailer distance minus the value of each number in Table 3. Those distances falling between two of the Table 3 sensor values will be assigned an angle value of the lower of the two Table 3 sensor values.

The final portion of the software filter is illustrated in FIG. 19. This method is applicable to both embodiments of the present invention (including the embodiment employing a fluxgate compass, as well as the embodiment using the three ultrasonic transducers). At steps 151 and 152 a determination is made whether there has been a change of at least 10° in the change in the angle between the tractor and the trailer since the last measurement. (In the first embodiment of the invention, the angle is derived from the tables illustrated in FIG. 11 whereas in the second embodiment of the invention the angle is directly read from the flux compasses.) Two steps or a parallel determination is necessary to check for changes both above and below the previous measurement. Next, at steps 153 and 154 a determination is made as to the correlation between the mirror position and the turn angle. If the mirror position does not correspond to the existing turn angle between the trailer and the tractor, the process moves to steps 155 or 156, and the mirror movement sequence is initiated based upon the output signal present at step 157. This signal will determine the direction of mirror movement as well as the extent to which the mirror moves. The exact mirror movement is determined the same way in both embodiments of the present invention (both the first embodiment illustrated in FIG. 14 and the second embodiment using fluxgate compasses as illustrated in FIG. 15).

At step 108 (of FIG. 14) and step 118 (of FIG. 15), the determination of appropriate mirror movement is used to generate motor current to move the motor at step 109. This movement is detected by the encoder which at step 109 feeds back information indicative of precise motor/mirror position for further mirror control. The vehicle operator has the option of overriding the automatic control by effecting manual override at step 111 using controls included with the console 60 (illustrated in FIG. 6B).

Figure 15:
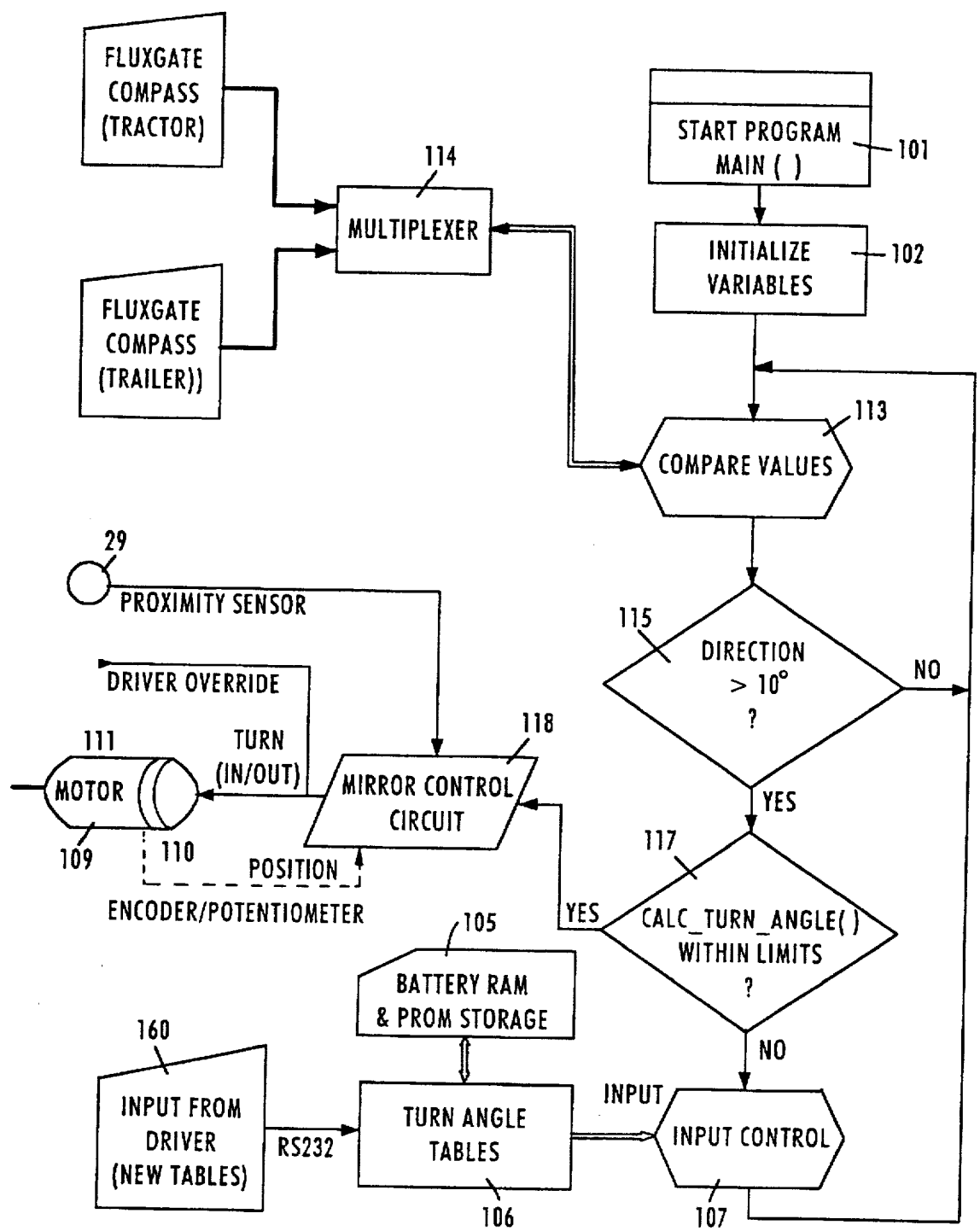
FIG. 15 is a block diagram illustrating the general operation of a second embodiment of the present invention.

FIG. 15 (of the second major embodiment) illustrates roughly the same process as FIG. 14 except for the use of dual fluxgate compasses, one mounted on each of the tractor and the trailer to determine the angle between the two vehicle portions. The description of this flow chart is provided, infra, along with that of the fluxgate compass. Because of the similarities and the two processes, the same flow diagram step designations will be used where appropriate.

The second embodiment of the present invention uses fluxgate compasses to determine the angle between the tractor and trailer of an articulated vehicle. This embodiment is illustrated in FIGS. 4A and 4B including the two fluxgate compasses 41A and 41B. Each fluxgate compass measures the Earth's magnetic field direction and sends this information to the microprocessor 81 (in FIG. 9). Any difference in angle between the two fluxgate compasses can be subtracted out by the microprocessor. Turning angle is thus, determined directly from the difference in compass directions. This method works best on vehicles where various obstructions between the tractor and the trailer would interfere with ultrasonics, or the front trailer surface is aerodynamically rounded or has no front surface at all, as will a flat bed trailer.

One disadvantage of this embodiment is that the fluxgate compass on the trailer must be connected to the tractor in order to provide direction signals to the microprocessor. Such connections, as illustrated by connector 42 in FIG. 4B, are vulnerable to environmental conditions such as vibration and other physical stress.

Figure 9:
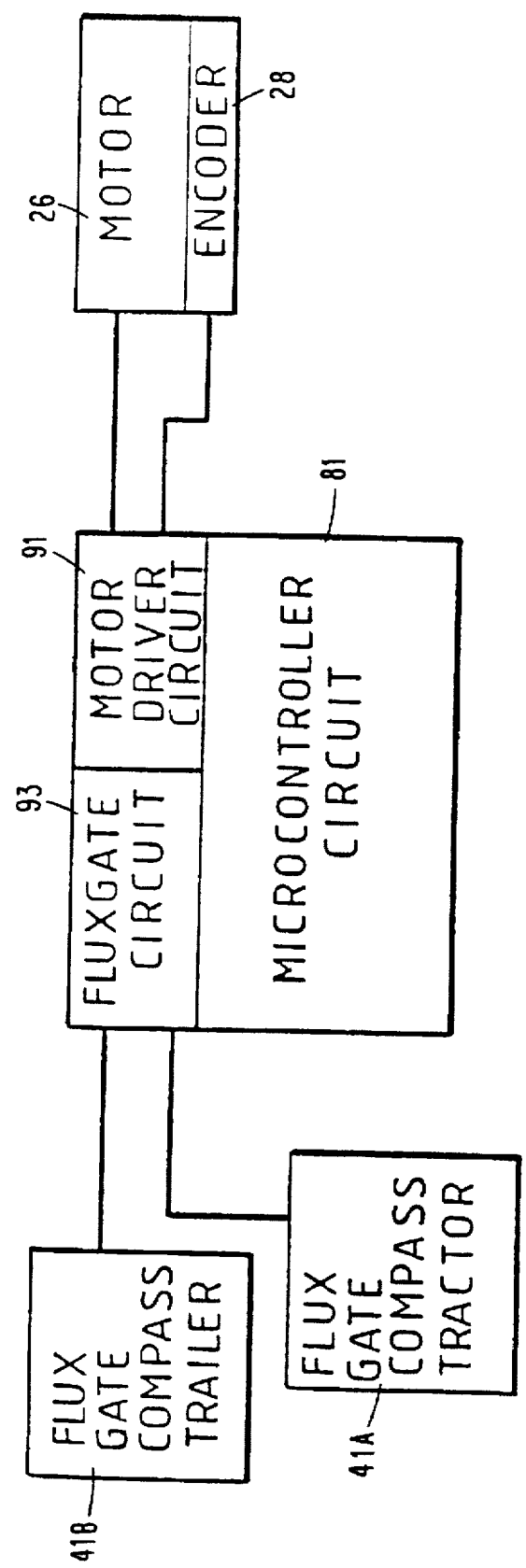
FIG. 9 is a block diagram of a second embodiment of the present invention.

The fluxgate compass arrangement uses a similar circuit configuration to that using the ultrasonic transducers, and is illustrated in FIG. 9. Only two fluxgate compasses need to be used, one for the tractor, 41A, and one for the trailer, 41B. Both are connected to a fluxgate circuit 93 located along with the microcontroller circuit 81. The microcontroller circuit is preferably a microprocessor similar to that used in the first embodiment of the present invention. The microprocessor package including motor driver circuit 91 is preferably located in the cab of the tractor as illustrated in FIG. 6B. The motor 26 and encoder 28 are the same as those used for the first embodiment of the present invention. An example of a common fluxgate compass is included in Appendix II attached hereto.

As previously stated, the mirror control circuit, activated by the change in turn angle will be identical for both embodiments of the present invention. FIG. 15 illustrates the operation of the second embodiment of the present invention and points out the distinctions between the first and second embodiments. As with the first embodiment, the program starts at step 101, either automatically, or as initiated by the vehicle operator. At step 102, the variables applicable to the fluxgate compasses are initialized in a manner similar to those of the ultrasonic transducers of the first embodiment of the present invention. However, since different pieces of hardware are involved in each of the two embodiments, it is known that the initialization step at 102 can also be used to "home" the mirror using proximity sensor 29.

Readings from the two fluxgate compasses are time-coordinated using a multiplexer at step 114. The values of the two fluxgate compasses are compared for each time frame at step 113 and an angle determined. At step 115, a determination is made if the change in angle is greater than 10° compared to the previous angular difference between the two fluxgate compasses. (This is essentially the process illustrated in FIG. 19.) Then, the angular difference is converted into a signal which is sent to the mirror control circuit at step 118. This signal is used to determine the extent to which the motor will be operated to move the mirror to the correct position. The other portions of the flow diagram of FIG. 15 operate in the same manner as described for the first embodiment illustrated by FIG. 14.

Figure 5A:
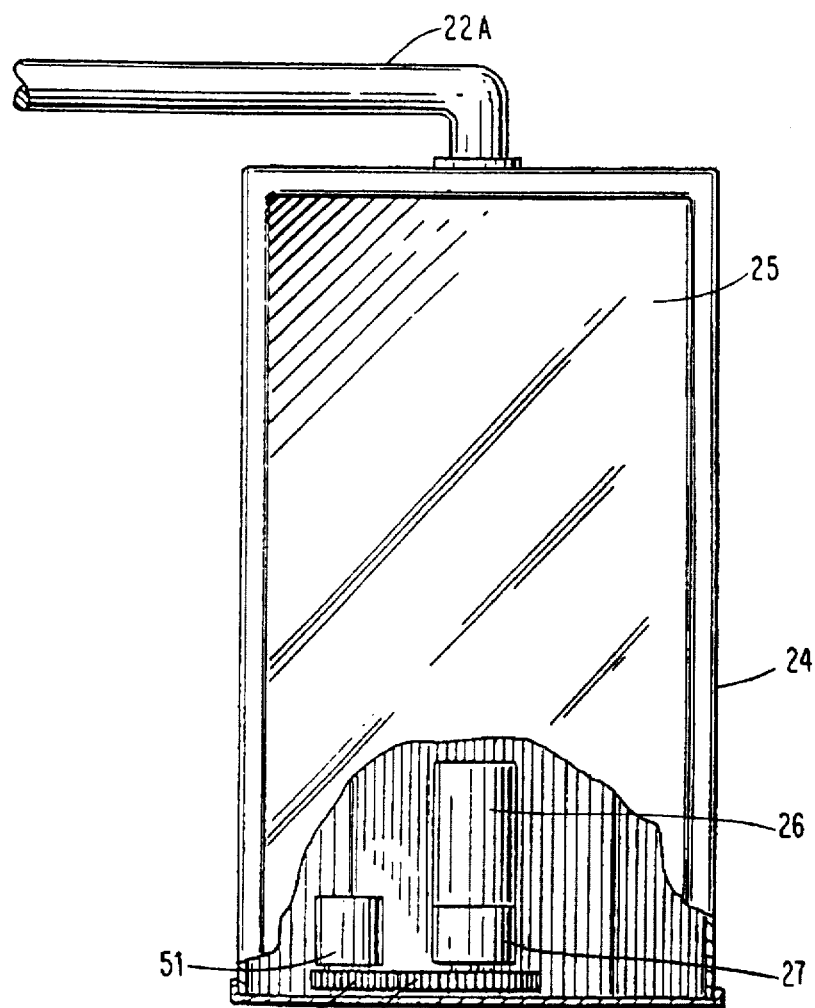
FIGS. 5A and 5B are diagrams illustrating the locations of components within the mirror for an alternative arrangement of the present invention.
Figure 5B:
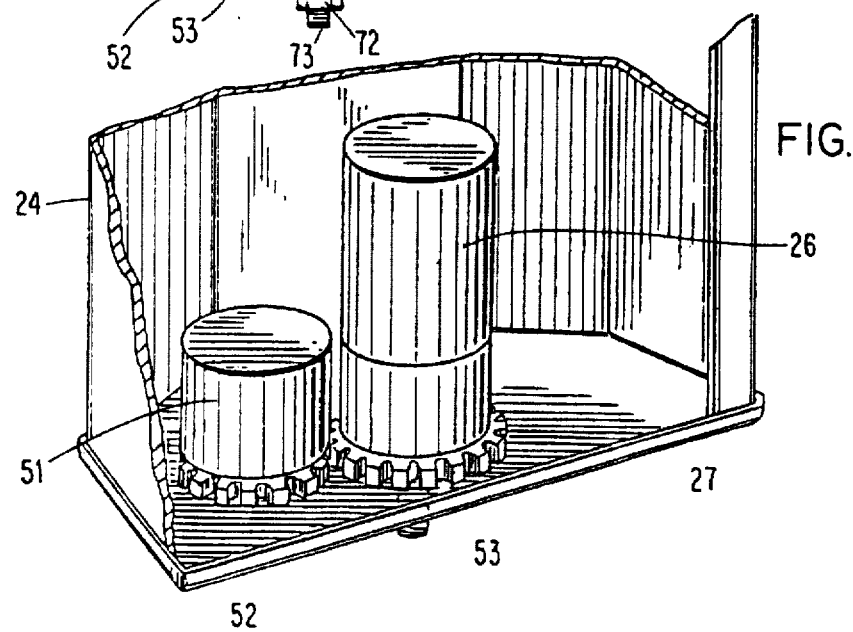

In an alternative circuit arrangement, applicable to both embodiments, a potentiometer is used instead of the magnetic encoder to determine the position of the mirror for feedback purposes. This arrangement is illustrated in FIGS. 5A and 5B. Potentiometer 51 is a variable resistor with a center tap output that is proportional to the number of turns from a fully clockwise or fully counter clockwise position. The potentiometer would be placed to mesh with the gears 53 of the reduction gear head 27 with a total amount of turns is approximately 20–30. The motor movement is translated to the potentiometer through potentiometer gears 52. Normally a voltage of five volts is placed across the two end terminals (not shown) of the resistor and the center tap output is measured by an analog-to-digital (A/D) converter. Since the resistance value at the center tap is proportional to the amount of turns, so is the voltage. This device is equivalent to an absolute encoder since there would be no reason to zero out or "home" the mirror once the voltage associated with a fully clockwise or a fully counter clockwise position is stored in the memory. The output of the A/D converter (not shown) is 7-bits, which would give a resolution of four counts or approximately 150 mvolts per degree of turn of the mirror if a 30 turn potentiometer is used. This output would be read directly by the mirror control circuit 84 (FIG. 13) of the analog circuit 83 of microprocessor 81. It is noted that any other suitable feedback arrangement can be used in the present invention if circumstances permit.

In summary, the present invention provides a mirror tracking system automatically driving a side view vehicle mirror to keep in alignment with the turning of an articulated vehicle so that a rear side corner of the vehicle is always in view of the vehicle operator. Two major embodiments are disclosed. The first including at least three ultrasonic transducers mounted on the upper third portion of a tractor cab to bounce ultrasonic waves from the vehicle trailer being towed by the tractor. The second major embodiment includes a fluxgate compass mounted on each of the tractor and the trailer, and connected so as to provide a reading of angle difference between the tractor and the trailer. A variation to both of these embodiments is the use of a potentiometer as an encoder providing feedback information regarding the position of the motor driving the mirror.

While these embodiments and variations have been described and illustrated, it is clear that variations in the details of these embodiments may be made without departing from the true spirit and scope of the invention as defined in the appended claims. For example, more than three ultrasonic transducers can be used in the first embodiment of the invention. Further, these transducers can be mounted anywhere on the top of the tractor as long as the full radiation pattern of the ultrasonic transducers is permitted to propagate. Further, while piezoelectric transducers have been described, electrostatic ultrasonic transducers can be substituted if such transducers have the characteristics necessary to withstand the operating environment. This environment can change depending upon the vehicle using the present invention. For example, the articulated vehicle may be a piece of construction equipment, and more than one mirror can be controlled. Also, a boat or even an airplane can use the present invention to aid in moving in small spaces. The programming of the microprocessor controlling the mirror movement can be altered so that a pattern of different viewing angles are displayed as the vehicle moves, rather than just the view of the rear side corner of the trailer as illustrated in the appended drawings.

Although the present invention has been described and illustrated in detail, it is clearly understood that the same as by way of illustration and example only and is not to be taken by way of limitation, the spirit and scope of the present invention being limited only by the terms of the following claims.

I claim:

1. An automatic mirror position tracking system for use on an articulated vehicle having a first portion and a second portion, the system comprising:
   a mirror movably mounted on the first portion of the articulated vehicle;
   a drive mechanism coupled to the mirror for moving the mirror in response to a control signal;
   a first ultrasonic transducer arranged on a centerline of the first portion of the articulated vehicle and oriented to sense ultrasonic signals reflected off an opposing surface of the second portion of the articulated vehicle;
   a second ultrasonic transducer arranged on the first portion of the articulated vehicle at a predetermined distance to one side the first ultrasonic transducer, wherein the second ultrasonic transducer is oriented to sense ultrasonic signals reflected off an opposing surface of the second portion of the articulated vehicle;
   a third ultrasonic transducer arranged on the first portion of the articulated vehicle at a predetermined distance to the other side of the first ultrasonic transducer, wherein the third ultrasonic transducer is oriented to sense ultrasonic signals reflected off an opposing surface of the second portion of the articulated vehicle; and
   a control circuit for generating the control signal in response to sensory output signals of the first, second and third ultrasonic transducers.

2. A system as in claim 1, wherein the control circuit includes a memory storing at least one look-up table correlating sensory output information from the first, second and third ultrasonic transducers to angular positions of the mirror.

3. A system as in claim 2, wherein said control circuit comprises:
   a feedback arrangement providing a signal representative of a position of the mirror; and
   a microprocessor for generating the control signal in response to the signal representative of a position of the mirror and the sensory output signals.

4. A system as in claim 3, wherein the feedback arrangement comprises a magnetic encoder coupled to the mirror.

5. A system as in claim 3, wherein the feedback arrangement comprises a potentiometer coupled to the mirror.

6. A system as in claim 1, wherein said drive mechanism comprises a DC motor coupled to the mirror.

7. A system as in claim 6, wherein said drive mechanism further comprises a reduction gear head providing a mechanical coupling between the DC motor and the mirror.

8. A system as in claim 1, wherein the first, second and third ultrasonic transducers are piezoelectric devices.

9. A system as in claim 8, wherein the piezoelectric devices have an asymmetrical radiation pattern.

10. An automatic mirror position tracking system for use on an articulated vehicle having a first portion and a second portion, the system comprising:
    a mirror movably mounted on the first portion of the articulated vehicle;
    a drive mechanism coupled to the mirror for moving the mirror in response to a control signal;
    a plurality of transducers, each respective transducer producing a signal representative of distance between the respective transducer and a surface of the second portion of the articulated vehicle as a function of a signal reflected from a surface of the second portion of the articulated vehicle;
    a memory storing:
       (a) measured baseline signal values for the respective transducers when the articulated vehicle is in a straight line, and
       (b) at least one look-up table containing distance-difference information for the respective transducers for a plurality of turn-angles of the articulated vehicle; and
    a controller using the measured baseline signal values and the look-up table to generate the control signal in response to the signals from the transducers during operation of the articulated vehicle.

11. A system as in claim 10, wherein:
    the memory also stores information identifying a home position of the mirror, and the controller generates the control signal to move the mirror a predetermined amount in relation to the home position.

12. A system as in claim 10, wherein the transducers comprise ultrasonic transducers.

13. A system as in claim 12, wherein the ultrasonic transducers are piezoelectric devices.

14. A system as in claim 13, wherein the piezoelectric devices have an asymmetrical radiation pattern.

15. A system as in claim 10, wherein the controller comprises a microprocessor.

16. A system as in claim 15, further comprising a feedback arrangement providing a signal representative of a position of the mirror to the microprocessor.

17. An automatic mirror position tracking system for use on an articulated vehicle having a first portion and a second portion, the system comprising:

a mirror movably mounted on the first portion of the articulated vehicle;

a drive mechanism coupled to the mirror for moving the mirror in response to a control signal;

a plurality of transducers, each respective transducer producing a signal representative of distance between the respective transducer and a surface of the second portion of the articulated vehicle as a function of a signal reflected from a surface of the second portion of the articulated vehicle;

a memory storing a plurality of look-up tables correlating transducer output information to vehicle angle under a plurality of conditions; and a controller using a selected one of the look-up tables, corresponding to a current condition, to generate the control signal in response to the signals from the transducers.

18. A system as in claim 17, wherein the controller comprises a microprocessor.

19. A system as in claim 17, further comprising a feedback arrangement providing a signal representative of a position of the mirror to the controller.

20. A system as in claim 19, wherein the feedback arrangement comprises a magnetic encoder coupled to the mirror.

21. A system as in claim 19, wherein the feedback arrangement comprises a potentiometer coupled to the mirror.

22. A system as in claim 17, wherein the look-up tables comprise distance-angle tables.

23. A system of claim 22, wherein the distance-angle tables correspond to different vehicle types and different configurations of said first and second portions of the different vehicle types.

24. An automatic mirror position tracking system for use on an articulated vehicle having a first portion and a second portion, the system comprising:

a mirror movably mounted on the first portion of the articulated vehicle;

a drive mechanism coupled to the mirror for moving the mirror in response to a control signal;

a plurality of transducers arranged on the first portion of the articulated vehicle radiating ultrasonic beams toward a surface of the second portion of the articulated vehicle and sensing ultrasonic signal reflections, wherein the radiated ultrasonic beams have an asymmetrical cross section perpendicular to the direction of radiation; and a controller generating the control signal responsive to the sensed ultrasonic signal reflections.

25. A system as in claim 24, wherein the asymmetrical cross section is wider in a horizontal dimension than in a vertical dimension.

26. A system as in claim 24, wherein the asymmetrical cross section is elliptical.

27. A system as in claim 24, wherein each of the radiated ultrasonic beams spreads through a 40° pattern in the horizontal direction and spreads through a 15° pattern in the vertical direction.

28. A system as in claim 24, wherein the controller comprises a microprocessor.

29. A system as in claim 28, further comprising a feedback arrangement providing a signal representative of a position of the mirror to the microprocessor.

30. A system as in claim 28, further comprising a memory storing at least one distance-angle look-up table.

* * * * *